(12) United States Patent
Akiyama et al.

(10) Patent No.: US 8,832,438 B2
(45) Date of Patent: Sep. 9, 2014

(54) DIGITAL SIGNATURE GENERATION APPARATUS, DIGITAL SIGNATURE VERIFICATION APPARATUS, AND KEY GENERATION APPARATUS

(71) Applicant: Kabushiki Kaisha Toshiba, Tokyo (JP)

(72) Inventors: Koichiro Akiyama, Tokyo (JP); Yasuhiro Goto, Hakodate (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/887,764

(22) Filed: May 6, 2013

(65) Prior Publication Data

US 2013/0243193 A1 Sep. 19, 2013

Related U.S. Application Data

(62) Division of application No. 13/241,374, filed on Sep. 23, 2011, now Pat. No. 8,458,471, which is a division of application No. 12/923,919, filed on Oct. 14, 2010, now Pat. No. 8,046,582, which is a division of application No. 11/491,301, filed on Jul. 24, 2006, now Pat. No. 7,836,304.

(30) Foreign Application Priority Data

Jul. 25, 2005 (JP) ................................ 2005-214994

(51) Int. Cl.
H04L 29/06 (2006.01)
H04L 9/32 (2006.01)

(52) U.S. Cl.
CPC ............ *H04L 9/3263* (2013.01); *H04L 9/3247* (2013.01); *H04L 9/3281* (2013.01)
USPC ............................ 713/168; 713/180; 713/170

(58) Field of Classification Search
CPC .... H04L 9/3263; H04L 9/3247; H04L 9/3281

USPC ......................................... 713/168, 170, 180
See application file for complete search history.

(56) References Cited

U.S. PATENT DOCUMENTS 6,486,882 B1 11/2002 Wolverton et al.
6,892,940 B2 5/2005 Kocarev et al.
(Continued)

FOREIGN PATENT DOCUMENTS

JP 2007-139895 6/2007

OTHER PUBLICATIONS

Koichiro Akiyama et al., "An Algebraic Surface Public-key Cryptosystem," The Institute of Electronics, Information and Communication Engineers, Technical Report of IEICE, ISEC2004-80, OIS2004-47, pp. 13-20 (Nov. 2004).

(Continued)

*Primary Examiner* — Lisa Lewis
(74) *Attorney, Agent, or Firm* — Finnegan, Henderson, Farabow, Garrett & Dunner, LLP

(57) ABSTRACT

A digital signature generation apparatus includes memory to store finite field $F_q$ and section $D(u_x(s, t), u_y(s, t), s, t)$ as secret key, section being one of surfaces of three-dimensional manifold $A(x, y, s, t)$ which is expressed by x-coordinate, y-coordinate, parameter s, and parameter t and is defined on finite field Fq, x-coordinate and y-coordinate of section being expressed by functions of parameter s and parameter t, calculates hash value of message m, generates hash value polynomial by embedding hash value in 1-variable polynomial h(t) defined on finite field $F_q$, and generates digital signature $D_s(U_x(t), U_y(t), t)$ which is curve on section, the x-coordinate and y-coordinate of curve being expressed by functions of parameter t, by substituting hash value polynomial in parameter s of section.

6 Claims, 13 Drawing Sheets

(56) References Cited

U.S. PATENT DOCUMENTS

| | | |
|---|---|---|
| 7,483,533 B2 | 1/2009 | Ibrahim |
| 2002/0001383 A1 | 1/2002 | Kasahara |
| 2005/0094806 A1 | 5/2005 | Jao et al. |
| 2005/0209940 A1 | 9/2005 | Lea et al. |
| 2005/0271203 A1 | 12/2005 | Akiyama et al. |
| 2009/0185680 A1 | 7/2009 | Akiyama et al. |

OTHER PUBLICATIONS

Koichiro Akiyama et al., "A Construction of an Algebraic Surface Public-key Cryptosystem," The Institute of Electronics, Information and Communication Engineers, 2005 Symposium on Cryptography and Information Security, (Jan. 25-28, 2005) (8 pages).

Koichiro Akiyama et al., "A Security Analysis for a Public-key Cryptosystem using Algebraic Surfaces," The Institute of Electronics, Information and Communication Engineers, The 2006 Symposium on Cryptography and Information Security, (Jan. 17-20, 2006) (10 pages).

Maki Iwami, "A Reduction Attack on Algebraic Surface Public-Key Cryptosystems," Institute of Mathematical Analysis, Japan, Kyoto University Institute of Mathematical Analysis, vol. 1572, pp. 114-123, (Nov. 2007).

Shigenori Uchiyama et al., "On the Security of the Algebraic Surface Public-Key Cryptosystems," The Institute of Electronics, Information and Communication Engineers, The 2007 Symposium on Cryptography and Information Security, pp. 1-5, (Jan. 23-26, 2007).

Notification of Reasons for Rejection, mailed Apr. 27, 2010, in corresponding Japanese Patent Application No. 2005-214994, and English-language translation thereof (11 pages total).

Shor, "Algorithms for Quantum Computation: Discrete Logarithms and Factoring," Proceedings of the 35$^{th}$ Annual IEEE Symposium on Foundations of Computer Science, p. 124-134 (1994).

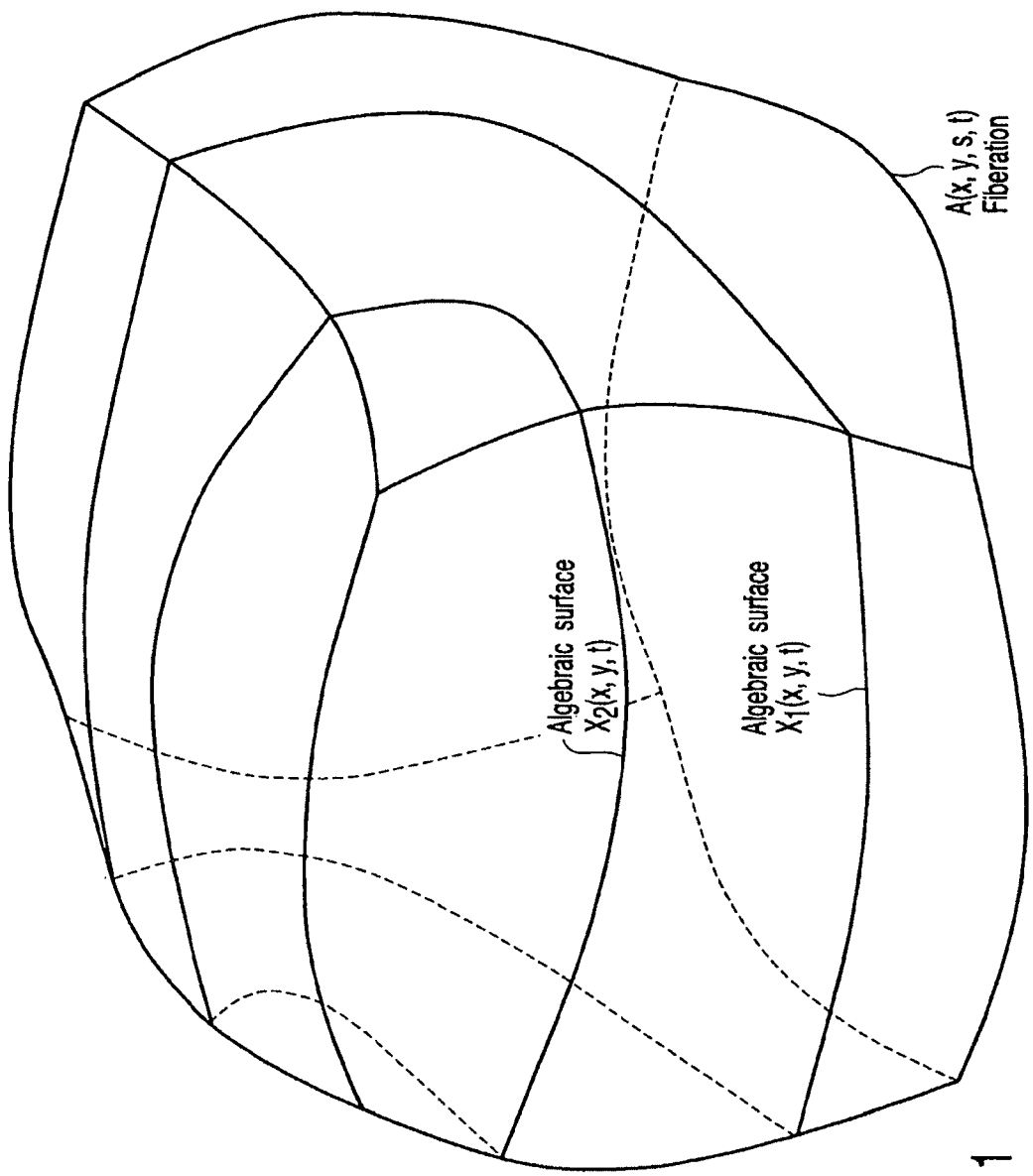
F I G. 1

DIGITAL SIGNATURE GENERATION APPARATUS, DIGITAL SIGNATURE VERIFICATION APPARATUS, AND KEY GENERATION APPARATUS

CROSS-REFERENCE TO RELATED APPLICATIONS

This application is a division of application Ser. No. 13/241,374, filed Sep. 23, 2011, which is a division of application Ser. No. 12/923,919, filed Oct. 14, 2010 (now U.S. Pat. No. 8,046,582), which is a division of application Ser. No. 11/491,301, filed Jul. 24, 2006 (now U.S. Pat. No. 7,836,304), which is based upon and claims the benefit of priority from prior Japanese Patent Application No. 2005-214994, filed Jul. 25, 2005, the entire contents of all of which are incorporated herein by reference.

BACKGROUND OF THE INVENTION

1. Field of the Invention

The invention relates to a digital signature generation apparatus, digital signature verification apparatus, and key generation apparatus, which exploit a common-key cryptosystem technique.

2. Description of the Related Art

In the present-day network society in which people communicate by exchanging lots of information such as e-mail messages and the like on networks, cryptosystem techniques are prevalently used as means for retaining information security and authenticity.

The cryptosystem techniques can be roughly classified into a common-key cryptosystem technique and public-key cryptosystem technique. The common-key cryptosystem technique is a cryptosystem based on a data stirring algorithm, can make high-speed encryption and decryption, and allows only two parties having a common key to make secret communications and authentication communications. The public-key cryptosystem technique is a cryptosystem based on a mathematical algorithm, and does not require prior key sharing although its encryption and decryption speeds are not higher than the common-key cryptosystem technique. The public-key cryptosystem technique is characterized in that a secret communication is implemented using a public key published by a sending partner, and an authentication communication can be made by applying a digital signature (by preventing spoofing) using a secret key of the sender.

For this reason, the digital signature based on the common-key cryptosystem technique is used as authentication means when high-speed processing is required between partners or devices or when one of a signature generation apparatus and a signature verification apparatus has lower performance in an environment in which a secret key can be shared. The digital signature based on the public-key cryptosystem technique is used when a secret key cannot be shared in online shopping sites and online sites of banks and securities companies doing business on the Internet or when the computation performances of both the signature generation apparatus and signature verification apparatus are high even in an environment in which a secret key can be shared.

As the typical public-key cryptosystem technique, RSA and elliptic curve cryptosystems are known, and digital signature schemes based on these techniques have been proposed. In the RSA cryptosystem, the difficulty of the prime factorization problem is the grounds for its security, and modulo exponentiation calculations are used as signature generation calculations and signature verification calculations. In the elliptic curve cryptosystem, the difficulty of the discrete logarithm problem on an elliptic curve is the grounds for its security, and point calculations on the elliptic curve are used as signature generation calculations and signature verification calculations. With these public-key cryptosystem techniques, a cryptanalysis (signature forgery method) associated with a specific key (public key) has been proposed, but a general cryptanalysis (signature forgery method) is unknown. Hence, serious security problems have not been found yet except for a cryptanalysis using a quantum computer (to be described later).

As another digital signature scheme based on the public-key cryptosystem, a scheme called SFLASH based on the multivariate cryptosystem which sets a problem of solving simultaneous equations formed using an extended theory of fields as the grounds for its security is known. However, prevailing attack methods against the multivariate cryptosystem are known, and a required key size must be increased to avoid that cryptanalysis. Hence, the practicality of this scheme is beginning to be viewed with suspicion.

Meanwhile, even the RSA and elliptic curve cryptosystems which are prevalently used in digital signature now are exposed to risk of decipher if a quantum computer appears. The quantum computer is a computer which can make massive parallel computations using a physical phenomenon called entanglement (based on a principle different from the current computers). To date, the quantum computer is a virtual computer whose operation is confirmed merely on the experimental basis, but research and development toward implementation is being made. Shor demonstrated in 1994 that algorithms which can efficiently solve the prime factorization and discrete logarithm problems using this quantum computer can be configured (P. W. Shor: "Algorithms for Quantum Computation: Discrete Log and Factoring", Proceedings of the 35th Annual IEEE Symposium on Foundations of Computer Science, 1994).

That is, if the quantum computer is implemented, the RSA cryptosystem based on the prime factorization and the elliptic curve cryptosystem based on the discrete logarithm problem (on the elliptic Curve) can be decrypted.

Under such circumstances, studies about digital signature based on the public-key cryptosystem which is still secure after implementation of the quantum computer have been made in recent years. As a scheme which can be implemented at present and whose cryptanalysis is difficult even by the quantum computer, a scheme called SFLASH based on the multivariate cryptosystem is known. However, as described above, since the multivariate cryptosystem requires a huge key size to warrant security for existing computers, its practicality is doubtful.

Furthermore, the public-key cryptosystem requires a larger circuit scale and longer processing time than the common-key cryptosystem. Hence, the public-key cryptosystem cannot be implemented in a low-power environment such as mobile terminals and the like, or a long processing time is required if it can be implemented. For this reason, a public-key cryptosystem which can be implemented even in a low-power environment is demanded.

In general, a digital signature based on the public-key cryptosystem is configured to find out a problem (such as the prime factorization problem, discrete-logarithm problem, and the like) which is hard to calculate and to make generation of a digital signature on a message called plaintext (without knowing any secret key) equivalent to solution of the problem which is hard to calculate in terms of a computation volume. However, even if such problem which is hard to calculate is found, a digital signature which sets that problem as the grounds for its security cannot always be configured. If the problem which is too hard to calculate is set as the grounds for security, a problem of generation of a key becomes hard, resulting in a difficult configuration. On the other hand, if an easy problem is used to allow key generation, a digital signature is easily forged.

Therefore, creativity that can reconfigure a problem having a fine balance, i.e., a problem which is easy enough to generate a key but is not easy enough to decrypt (without knowing any generated secret key) is required. Owing to this difficulty, digital signatures based on not many public-key cryptosystems have been proposed.

In this way, conventionally, there is no digital signature system (a system for generating a key, generating a digital signature, and verifying the signature) based on the public-key cryptosystem, which can warrant security even after the advent of the quantum computer, can be securely implemented even by existing computers, and has feasibility in a low-power environment.

BRIEF SUMMARY OF THE INVENTION

According to embodiments of the present invention, A digital signature generation apparatus includes a memory to store (1) a finite field $F_q$ and (2) a section $D(u_x(s, t), u_y(s, t), s, t)$ as a secret key, the section being one of surfaces of a three-dimensional manifold $A(x, y, s, t)$ which is expressed by an x-coordinate, a y-coordinate, a parameter s, and a parameter t and is defined on the finite field Fq, the x-coordinate and y-coordinate of the section being expressed by functions of the parameter s and the parameter t; calculates a hash value of a message m; generates a hash value polynomial by embedding the hash value in a 1-variable polynomial h(t) defined on the finite field $F_q$; and generates a digital signature $D_s(U_x(t), U_y(t), t)$ which is a curve on the section, the x-coordinate and y-coordinate of the curve being expressed by functions of the parameter t, by substituting the hash value polynomial in the parameter s of the section.

BRIEF DESCRIPTION OF THE SEVERAL VIEWS OF THE DRAWING

FIG. 1 is a view for explaining the fiberation and algebraic surfaces of a three-dimensional manifold;

DETAILED DESCRIPTION OF THE INVENTION

Figure 2:
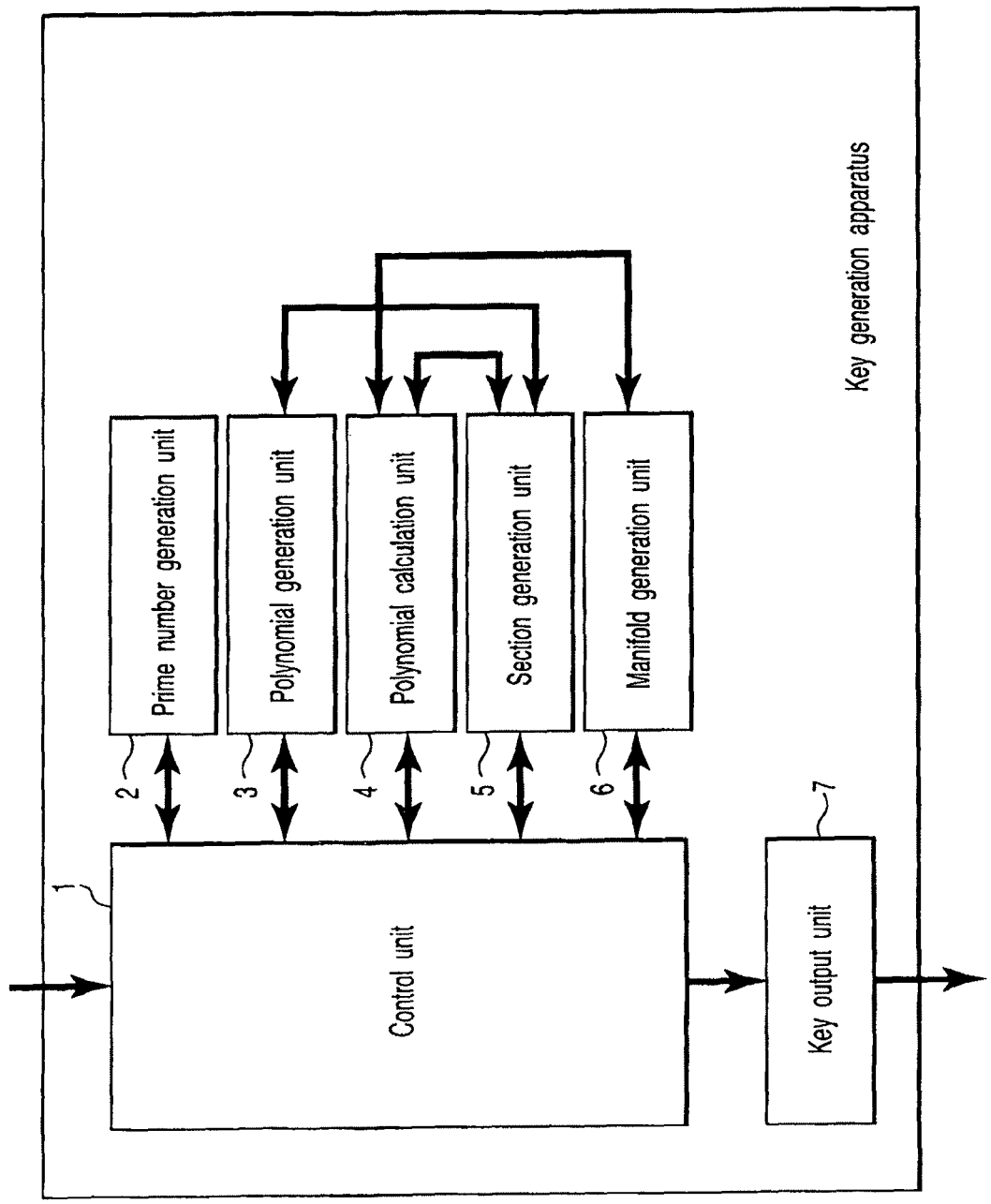
FIG. 2 is a block diagram showing an example of, the arrangement of a key generation apparatus.

Preferred embodiments of the invention will be described hereinafter with reference to the accompanying drawings.

An overview of this embodiment will be explained first.
(Overview)

In this embodiment, a three-dimensional (3D) manifold is defined as the one having degrees of freedom of three dimensions of a set of solutions of simultaneous (algebraic) equations defined on a field K. For example, since simultaneous equations given by:

$$\begin{cases} f_1(x, y, z, u, v, w) = 0 \\ f_2(x, y, z, u, v, w) = 0 \\ f_3(x, y, z, u, v, w) = 0 \end{cases} \quad (1)$$

include three equations that apply constraints to six variables, they have degrees of freedom of the three dimensions, and define a 3D manifold.

Especially, a space which is given by:

$$f(x,y,z,u)=0 \quad (2)$$

and is defined as a set of solutions of a 4-variable algebraic equation defined on K is also a 3D manifold on K.

Note that definition equations of the 3D manifolds given by equations (1) and equation (2) are those on an affine space, and that on a projective space (in case of equation (2)) is given by:

$$f(x,y,z,u,v)=0$$

Since this embodiment does not handle the 3D manifold on the projective space, the definition equation is given by equations (1) or equation (2). However, even when the 3D manifold is expressed on the projective space, this embodiment is achieved intact. On the other hand, an algebraic surface has degrees of freedom of two dimensions of a set of solutions of simultaneous (algebraic) equations defined on the field K. Therefore the algebraic surface is defined, e.g., by:

$$g(x,y,z)=0$$

Since this embodiment handles only a 3D manifold given by only one equation like equation (2), equation (2) will be handled as a definition equation of the 3D manifold.

A "field" is a set that freely allows addition, subtraction, multiplication, and division, and real number, rational number, and complex number correspond to this. For example, a set such as integer number, a matrix, or the like which includes elements that are indivisible except for "0" is not a field. Of fields, a field called a finite field including a finite number of elements is known. For example, a coset Z/pZ which has p as a modulus with respect to a prime number p forms a field. Such field is called a prime field, and is expressed by $F_p$. The finite field also includes a field $F_q$ ($q=p^r$) having elements the number of which is a power of prime. However, this embodiment mainly handles only the prime field $F_p$ for the sake of simplicity. In general, p of the prime field $F_p$ is called a characteristic of the prime field $F_p$. On the other hand, this embodiment is similarly achieved for a general finite field by applying a trivial modification.

The public-key cryptosystem is normally configured on a finite field because a message must be embedded as digital data. This embodiment also handles a 3D manifold defined on the finite field (especially, prime field in this embodiment) $F_p$.

In a 3D manifold A: $f(x, y, z, u)=0$, a plurality of algebraic surfaces normally exist, as shown in FIG. 1. Such algebraic surfaces are called divisors on the 3D manifold. In general, a problem for seeking (nontrivial) divisors when the definition equation of the 3D manifold is given is also a difficult problem which remains unsolved in the modern mathematics, and no general solving method is known except for a method using a multivariate equation to be described later.

Especially, in the 3D manifold defined on the finite field to be handled by this embodiment, there are a few clues compared with that defined on an infinite field (a field including an infinite number of elements) such as a rational number field or the like, and such problem is known as a more difficult problem. Furthermore, multivariate equations which appear to seek divisors have more varieties than those which appear upon breaking a multivariate cryptosystem, and solving methods proposed for the multivariate cryptosystem are generally not achieved.

This embodiment calls this problem as a divisor finding problem on the 3D manifold or simply as a divisor finding problem, and forms a public-key cryptosystem which sets the divisor finding problem on the 3D manifold as the grounds for security.

In definition equation $f(x, y, z, u)=0$ of the 3D manifold A expressed by an x-coordinate, y-coordinate, z-coordinate, and parameter u, variables z and u are replaced by parameters s and t to obtain:

$$g_{s,t}(x,y):=f(x,y,s,t)$$

This equation is considered as a polynomial having elements of a 2-variable algebraic function field $K(s, t)$ on the field K as coefficients. If $g_{s,t}(x,y)=0$ defines an algebraic curve on $K(s, t)$, we define that the 3D manifold A has a fiberation on an affine plane $P^2$ having s and t as parameters. Mapping $A \rightarrow P^2$ obtained by setting $(x, y, s, t)$ in correspondence with $(s, t)$ is called the fiberation on the affine plane $P^2$ of the 3D manifold A.

A curve $g_{s0,t0}(x,y)=0$ obtained by fixing a point: $(s,t)$ on the affine plane $P^2$ to one point $(s_0, t_0)$ ($s_0$ and $t_0$ are elements of the field K) is called a fiber on the point $(s_0, t_0)$, and is represented by $A_{s0,t0}$.

The 3D manifold having the fiberation on the affine plane $P^2$ often includes algebraic surfaces on the 3D manifold A, which are parameterized by s and t, are called "sections", and can be expressed by:

$$(x,y,s,t)=(u_x(s,t),u_y(s,t),s,t)$$

Some fiberations have no sections, but $f(x, y, z, u)$ having sections can be easily configured.

On the other hand, as described above, definition equation $f(x, y, z, u)=0$ of the 3D manifold A can be considered on, e.g., a 1-variable algebraic function field $K(t)$ in place of the 2-variable algebraic function field $K(s, t)$. In this case, if we have:

$$h_t(x,y,s):=f(x,y,s,t)$$

$h_t(x, y, s)=0$ defines an algebraic surface on the 1-variable algebraic function field $K(t)$ for respective values of t. At this time, we define that A has a fiberation on an affine line $P^1$ having t as a parameter, and mapping $A \rightarrow P^1$ obtained by setting $(x, y, s, t)$ in correspondence with $(t)$ is called a fiberation on the affine line $P^1$ of the 3D manifold A.

A curved surface obtained when a point t on the affine line $P^1$ is fixed to one point $t_0$:

$$h_{t0}(x,y,s)=0$$

is called a fiber on the point $t_0$, and is represented by $A_{t0}$.

A section in the 3D manifold having the fiberation on the affine line $P^1$ can be expressed by:

$$(x,y,s,t)=(u_x(t),u_y(t),u_s(t),t)$$

and corresponds to an algebraic curve parameterized by t on the 3D manifold A.

The section is a divisor of the 3D manifold. In general, if the fiberation of a 3D manifold is given, a corresponding fiber can be immediately obtained (by substituting elements of the field in s and t), but it is very difficult to obtain a corresponding section.

The digital-signature to be described in this embodiment is the one which sets a problem for obtaining a section as the grounds for security of the divisor finding problem on the 3D manifold especially when the fiberation of the 3D manifold A is given.

Note that since this embodiment mainly handles the fiberation on the affine plane $P^2$, such fiberation will be simply referred to as a fiberation if it is apparent that the fiberation is that on the affine plane $P^2$ for the sake of simplicity. In this case, definition equation $f(x, y, z, u)=0$ of the 3D manifold having the fiberation will also be referred to simply as the fiberation.

In order to obtain the section from the fiberation, even in the modern mathematics, the following method alone is known. That is, assuming a section $(u_x(s, t), u_y(s, t), s, t)$ is:

$$\deg_s u_x(s,t) < r_{sx}, \deg_t u_x(s,t) < r_{tx}$$

$$\deg_s u_y(s,t) < r_{sy}, \deg_t u_y(s,t) < r_{ty}$$

(where $\deg_s u_x(s, t)$ is the degree when only s is used as a variable in $u_x(s, t)$) given:

$$u_x(s,t)=\alpha_0+\alpha_1 t+\alpha_2 s+\alpha_3 st+\ldots+\alpha_{r_{sx}r_{tx}-1}s^{r_{sx}-1}t^{r_{tx}-1}$$

$$u_y(s,t)=\beta_0+\beta_1 t+\beta_2 s+\beta_3 st+\ldots+\beta_{r_{sy}r_{ty}-1}s^{r_{sy}-1}t^{r_{ty}-1}$$

substituting these equations in $A(x, y, s, t)=0$ yields:

$$A(u_x(s,t), u_y(s,t), s, t) = \sum_i c_{i,j} s^i t^j = 0$$

and expanding the left-hand side of this equation to express the coefficient of $s^i t^j$ by a function $c_{i,j}(\alpha 0, \ldots, \alpha r_{sx}r_{tx-1}, \beta 0, \ldots, Br_{sy}r_{ty-1})$ of $\alpha 0, \ldots, \alpha r_{sx}r_{tx-1}, \beta 0, \ldots, Br_{sy}r_{ty-1}$ sets and solves simultaneous equations:

$$\begin{cases} c_{0,0}(\alpha_0, \ldots, \alpha_{r_{sx}r_{tx}}-1, \beta_0, \ldots, \beta_{r_{sy}r_{ty}}-1) = 0 \\ c_{0,1}(\alpha_0, \ldots, \alpha_{r_{sx}r_{tx}}-1, \beta_0, \ldots, \beta_{r_{sy}r_{ty}}-1) = 0 \\ \vdots \\ c_{1,k}(\alpha_0, \ldots, \alpha_{r_{sx}r_{tx}}-1, \beta_0, \ldots, \beta_{r_{sy}r_{ty}}-1) = 0 \end{cases}$$

That is, the public-key cryptosystem of the invention amounts to solving a problem of simultaneous equations as in the multivariate cryptosystem described in the prior art. However, the multivariate cryptosystem amounts to solving a problem of multivariate equations within a very limited range depending on the theory of a finite field extension (interpreted well in the modern mathematics), while the 3D manifold cryptosystem depends on the divisor finding problem as an unsolved problem on the mathematics. Thus, the difficulty levels of the problems in the two cryptosystems are considerably different.

The detailed configuration of the digital signature based on the divisor finding problem on the 3D manifold will be described below. Note that the 3D manifold defined on $F_p$ will be examined below. For this reason, all calculations are made on $F_p$.

First Embodiment

A public key used in the digital signature according to this embodiment is defined by the fiberation: $A(x, y, s, t)=0$ of a 3D manifold X on $F_p$.

A secret key is defined by each of n sections Di: $(x, y, s, t)=(u_{x,i}(s, t), u_{y,i}(s, t), s, t)$ of the 3D manifold A on $F_p$.

These keys can be easily obtained by a key generation method to be described later.

(1) Signature Generation Processing

An overview of the signature generation processing will be described below. In the signature generation processing, a message (to be referred to as plaintext hereinafter) to be generated as a signature is converted into an integer m. As the conversion method, it is a common practice to convert the message into a code using a code system such as JIS code or the like, and to read that code as an integer.

Next, a hash value h(m) is calculated from the converted integer m by using a hash function h(x). Since the hash value h(m) generally has 120 bits to 160 bits, it is divided into a plurality of blocks $h_0, h_1, \ldots, h_{r-1}$ like:

$$h(m)=h_0\|h_1\|\ldots\|h_{r-1}$$

and these blocks are embedded into coefficients of a 1-variable polynomial for a variable t:

$$h(t)=h_{r-1}t^{r-1}+\ldots+h_1t+h_0$$

This is called hash value embedding processing hereinafter. The 1-variable polynomial embedded with the hash value is called a hash value polynomial h(t). In order to define h(t) as a polynomial on $F_p$, each $h_i$ ($0 \leq i \leq r-1$) must be set to be an element of $F_p$. That is, the hash value is divided based on the bit length of p to satisfy:

$$0 \leq h_i \leq p-1$$

One of n sections Di as the secret-keys is randomly selected. The hash value polynomial h(t) is substituted in the variable s of the selected section:

$$D_i:(w_x(s,t),w_y(s,t),s,t)$$

That is, $$(w_x(h(t),t),w_y(h(t),t),h(t),t)$$

By arranging this, we have:

$$D_s:(x,y,t)=(W_x(t),W_y(t),t) \quad (3)$$

This is sent as a digital signature $D_s$ for the message m to the recipient together with the message m.

As can be seen from the above description, the digital signature $D_s$ given by equation: (3) is a curve on the section Di used as the secret key.

In terms of security, the degrees of $W_x(t)$ and $W_y(t)$ are preferably constant irrespective of the selected section. This can be achieved if $u_{x,i}(s, t)$ includes the term of $s^{hx}t^{kx}$ for all "i"s if:

$$h_x=\max\{\deg_s u_{x,i}(s,t)|1\leq i\leq n\}k_x=\max\{\deg_t u_{x,i}(s,t)|1\leq i\leq n\}$$

for a polynomial $u_{x,i}(s, t)$ which appears in the section. This is because even when the hash value polynomial h(t) is substituted in s of any section, the term of the maximum degree of the obtained polynomial $W_x(t)$ is generated from the polynomial obtained by substituting h(t) in the term of $s^{hx}t^{kx}$.

As for $u_{y,i}(s, t)$, the degree of $W_y(t)$ can be maintained constant irrespective of i by the same means. A method of generating such keys (sections and corresponding 3D manifold) will be described later.

(2) Signature Verification Processing

The recipient who received the digital signature $D_s(x, y, t)$ executes the following signature verification processing using his or her public key A(x, y, s, t) defined on the finite field $F_p$.

As in the aforementioned signature generation processing, a message (to be referred to as plaintext hereinafter) is converted into an integer m. The conversion method is the same as that in the signature generation processing. By using the same hash function h(x) as in the aforementioned signature generation processing, a hash value h(m) is calculated from the converted integer m. Furthermore, as in the aforementioned signature generation processing, the hash value is divided into a plurality of blocks $h_0, h_1, \ldots, h_{r-1}$ like:

$$h(m)=h_0\|h_1\|\ldots\|h_{r-1}$$

and these blocks are embedded into coefficients of a 1-variable polynomial for a variable t:

$$h(t)=h_{r-1}t^{r-1}+\ldots+h_1t+h_0$$

defined on the finite field $F_p$, thus generating a hash value polynomial h(t) embedded with the hash value.

The generated hash value polynomial h(t) is substituted in a variable s of the 3D manifold A(x, y, s, t) as the public key to generate an algebraic surface:

$$X(x,y,t)=A(x,y,h(t),t)$$

This X(x, y, t) is also an algebraic surface having the fiberation.

Next, the digital signature expressed by equation (3) received by the receiving side) is substituted in the obtained algebraic surface X. If the value becomes "0", it means that the digital signature is correct; otherwise, it means that the digital signature is incorrect.

This is because in the aforementioned digital signature generation processing, s=h(t) is substituted in the section Di randomly selected from those given as the secret keys. This corresponds to the section of the algebraic surface X(x, y, t) obtained by substituting s=h(t) in the 3D manifold A(x, y, s, t) in the aforementioned digital signature verification processing. Therefore, when the substituting operation like in the aforementioned digital signature verification processing is done, the value becomes "0".

Furthermore, as is known, obtaining the section of the algebraic surface obtained by substituting s=h(t) is difficult as in the 3D manifold, and amounts to solving a problem of multivariate equations. Hence, as will be described in the paragraphs of security signature (to be described later), presenting of the section of an algebraic surface corresponding to the message by a third party who does not know the section of the 3D manifold amounts to a problem for obtaining the section of that algebraic surface. For this reason, it is impossible to execute such processing (in terms of the computation volume). This is the grounds for the digital signature of the invention being secure.

(3) Key Generation Method

The key generation method will be described below. Key generation of this embodiment is implemented by randomly selecting a section D1 or D2 and calculating a fiberation corresponding to the selected section. However, since the generated 3D manifold must have the two sections at the same time, the following device is required.

For the sake of simplicity, the key generation method will be described taking as an example a 3D manifold having the following fiberation of 3D manifolds:

$$E_t: y^2 = x^3 + a(s,t)x + b(s,t)$$

where $a(s, t)$ and $b(s, t)$ are 2-variable polynomials. Initially, a characteristic p of a prime field is determined. At this time, security is not a problem if p is small. Sections D1 and D2 are given by:

$$D_1:(x,y,s,t) = (u_x(s,t), u_y(s,t), s, t), D_2:(x,y,s,t) = (v_x(s,t), v_y(s,t), s, t)$$

and are substituted in the 3D manifold A to obtain $$u_y(s,t)^2 = u_x(s,t)^3 + a(s,t)u_x(s,t) + b(s,t)$$

$$v_y(s,t)^2 = v_x(s,t)^3 + a(s,t)v_x(s,t) + b(s,t)$$

When the corresponding sides of these equations are subtracted from each other, $b(s, t)$ disappears to yield:

$$u_y(s,t)^2 - v_y(s,t)^2 - (u_x(s,t)^3 - v_x(s,t)^3) = a(s,t)(u_x(s,t) - v_x(s,t))$$

In order to define $a(s, t)$ as a 2-variable polynomial, for example, it is sufficient if:

$$u_x(s,t) - v_x(s,t) | u_y(s,t) - v_y(s,t)$$

By utilizing this fact, key generation can be done by an algorithm to be described below.

Note that $k_1(s, t) | k_2(s, t)$ means that a polynomial $k_2(s, t)$ is divisible by a polynomial $k_1(s, t)$.

Two polynomials which meet $\lambda_x(s, t) | \lambda_y(s, t)$ are randomly selected. More specifically, in order to obtain a pair of such polynomials, for example, $\lambda_x(s, t)$ is randomly given, and $\lambda_y(s, t) = c(s, t)\lambda_x(s, t)$ is calculated by using a random polynomial $c(s, t)$ to obtain $\lambda_y(s, t)$.

Next, a polynomial $v_x(s, t)$ is randomly selected, and $u_x(s, t)$ is calculated by:

$$u_x(s,t) - v_x(s,t) = \lambda_x(s,t)$$

Likewise, a polynomial $v_y(s, t)$ is randomly selected, and $u_y(s, t)$ is calculated by:

$$u_y(s,t) - v_y(s,t) = \lambda_y(s,t)$$

By utilizing $u_x(s, t)$, $v_x(s, t)$, $u_y(s, t)$, and $v_y(s, t)$ calculated in this way, a polynomial $a(s, t)$ can be calculated by calculating:

$$a(s,t) = \{u_y(s,t)^2 - v_y(s,t)^2 - (u_x(s,t)^3 - v_x(s,t)^3)\} / (u_x(s,t) - v_x(s,t)) \quad (4)$$

Furthermore, by utilizing the above $a(s, t)$, $b(s, t)$ can be obtained by:

$$b(s,t) = u_y(s,t)^2 - u_x(s,t)^3 - a(s,t)u_x(s,t) \quad (5)$$

The aforementioned key generation method is not limited to the aforementioned example since it can be similarly implemented using a 3D manifold other than that described above as long as a definition equation is assumed in the form of:

$$y^2 = x^5 + a(s,t)x + b(s,t)$$

On the other hand, the aforementioned key generation method cannot generate algebraic surfaces having three or more sections. Also, it is difficult to generate a public key which can set the degree of $W_x(t)$ and $W_y(t)$ which appear in the digital signature:

$$D_s:(x,y,t) = (W_x(t), W_y(t), t)$$

described as the desired conditions in terms of security to be constant irrespective of the selected section. As a key generation method which can solve both these drawbacks, a second key generation method to be described below may be used.

The term $s^{hx}t^{kx}$ of the maximum degree of $u_{x,i}(s, t)$ is determined, and n 2-variable polynomials $u_{x,i}(s, t)$ are defined so that the maximum degree of a is hx, and that of t is kx. Likewise, the term $s^{hy}t^{ky}$ of the maximum degree of $u_{y,i}(s, t)$ is determined, and n 2-variable polynomials $u_{y,i}(s, t)$ are defined so that the maximum degree of s is hy, and that of t is ky.

Next, factors $(x - u_{x,i}(s, t))$ and $(y - u_{y,i}(s, t))$ are generated from these polynomials, and two factors $(x - u_{x,i}(s, t))$ and $(y - u_{y,i}(s, t))$ whose i has the same value are distributed to the left-hand side and right-hand side for respective "i"s ($1 \leq i \leq n$). Then, the product of the n factors distributed to the left-hand side and that of the n factors distributed to the right-hand side are coupled by an equal sign to obtain:

$$(x - u_{x,1}(s,t))(x - u_{x,2}(s,t)) \ldots (x - u_{x,n}(s,t)) = (y - u_{y,1}(s,t))(y - u_{y,2}(s,t)) \ldots (y - u_{y,n}(s,t)) \quad (6)$$

Equation (6) satisfies the above conditions. For example, Di: $(u_{x,i}(s, t), u_{y,i}(s, t), s, t)$ becomes sections.

Furthermore, if $h(t)$ is substituted in these sections, digital signatures $D_s$: $(W_x(t), W_y(t), t)$ with the same degree are generated due to their generation method. In practice, if equation (6) is used as it is, since sections are found soon, it is expanded to obtain a 3D manifold as the public key.

On the other hand, since the factors of x and those of y are respectively distributed to the right-hand side and left-hand side in equation (6), sections are often readily obtained by factorization. Hence, it is desired to generate a 3D manifold as the public key to randomly distribute the factors of x and those of y to both the sides like:

$$(x - u_{x,1}(s,t))(y - u_{y,2}(s,t)) \ldots (x - u_{x,n}(s,t)) = (y - u_{y,1}(s,t))(x - u_{x,2}(s,t)) \ldots (y - u_{y,n}(s,t))$$

By generating the public key and secret key, a highly secure 3D manifold having n or more sections can be generated. Certain degree of freedom can be provided to the generation method of $u_{x,i}(s, t)$ and $u_{y,i}(s, t)$ if the above-mentioned security concern is taken care of.

(4) Proof of Security

Security proof of the aforementioned digital signature will be explained below. The security of the digital signature can be proved by proving that it is possible to solve a problem for obtaining the sections of the 3D manifold in a polynomial time if the problem for generating a pair of a message (plaintext) and digital signature can be solved in the polynomial time, and by conversely proving that it is possible to generate the pair of the message (plaintext) and digital signature if the problem of obtaining the sections of the 3D manifold can be solved in the polynomial time. That is, by theoretically proving the above facts, it is proved that the possibility of generation of the pair of the message (plaintext) and digital signature (possibility of substantive forgery) is equivalent to the possibility of solution of the problem for obtaining the sections of the 3D manifold. Then, if the problem for obtaining the sections of the 3D manifold as the grounds for security is difficult, it is proved that it is impossible to make substantive forgery of the digital signature. The security proof according to the above policy will be described below.

Define that if a two-dimensional (2D) section D is described by $D = (d_x(s, t), d_y(s, t), s, t)$, the degree of the 2D section is the maximum value of the degrees of $d_x(s, t)$ and $d_y(s, t)$, i.e., $\max\{\deg(d_x(s, t)), \deg(d_y(s, t))\}$.

[Theorem 1] The fact that it is difficult to calculate the problem for obtaining the sections of the 3D manifold defined on the finite field $F_p$ having sections of degree n is equivalent to the fact that the digital signature of the invention is secure since it is impossible to make substantive forgery.

[Proof 1] Assume that algorithm a that can calculate a practical pair of plaintext and signature by the digital signature of this embodiment within the polynomial time exists. At this time, it will be proved that a polynomial time algorithm which obtains the 2D section of the 3D manifold using this algorithm α exists.

Let A(x, y, s, t) be a 3D manifold the 2D section of which is to be obtained. Next, a digital signature scheme which uses A(x, y, s, t) as a public key is considered, and pairs of plaintexts and signatures are generated as many as the number of polynomials. Assume that a hash value polynomial for plaintext $m_i$ is $h_i(t)$, and its signature is given by:

$$D_s^{(i)} = (f_i(h_i(t),t), g_i(h_i(t),t), t) \quad (7)$$

where $f_i(s, t)$ and $g_i(s, t)$ respectively correspond to the x- and y-coordinates of the section of the 3D manifold A, and only a finite number of values exist. Therefore, when a predetermined number or more of signatures are collected, all of $f_i(s, t)$ and $g_i(s, t)$ are not different, and some of them are identical. Which of $f_i(s, t)$ and $g_i(s, t)$ are identical can be determined by the following method.

A 3D manifold B(x, y, s, t) (=A(x, y, t, s)) will be examined below. This B(x, y, s, t) is obtained by exchanging s and t of the 3D manifold A(x, y, t, s), and has sections of degree n based on the definition of the degree of sections. Then, algorithm α is applied to generate a pair of plaintext and signature. In this case, especially, if the signature which is generated when the plaintext whose hash value polynomial $h_i(s)$ is a constant $h_i(s)-h_0$ is selected is given by:

$$D_s:(x,y,s) = (\zeta(h_0,s), \eta(h_0,s), s).$$

D:(x, y, s, t)=$(\zeta(s, h_0), \eta(s, h_0), s, h_0)$ gives one one-dimensional (1D) cycle of A(x, y, s, t) parameterized by s. Note that the cycle means a partial manifold, and especially, the 1D cycle is a 1D partial manifold. By utilizing this cycle D, of the 1D cycles given by:

$$D_s^{(i)} = (x,y,s,t) = (f_i(h_i(t),t), g_i(h_i(t),t), h_i(t), t)$$

the cycles which exist on the same section of X are found by the following polynomial algorithm.

If (s, t)=$(h_i(h_0))$, $(h_0)$ a point $(\zeta(h_i(h_0), h_0), \eta(h_i(h_0), h_0), h_i(h_0), h_0)$ on D and a point $(f_i(h_i(h_0), h_0), g_i(h_i(h_0), h_0), h_i(h_0), h_0)$ on $D_s^{(i)}$ are determined. Note that the section of X is isomorphic to a plane having (s, t) as coordinates. Then, if these points satisfy:

$$(\zeta(h_i(h_0),h_0), \eta(h_i(h_0),h_0)) = (f_i(h_i(h_0),h_0), g_i(h_i(h_0),h_0))$$

$D_s^{(i)}$ and D exist on the same section; otherwise, $D_s^{(i)}$ and D do not exist on the same section. A 1D cycle group included in the same section is given by:

$$D_s^{(k)} = (w_x(h_k(t),t), w_y(h_k(t),t), t) \quad (0 \leq j \leq 1) \quad (8)$$

If a section $(w_x(s, t), w_y(s, t), s, t)$ of the 3D manifold A(x, y, s, t) is described by:

$$w_x(s, t) = \sum_{i,j} a_{ij} s^i t^j, \quad w_y(s, t) = \sum_{k,l} b_{kl} s^k t^l$$

the 1D cycle given by equation (8) is substituted to obtain:

$$w_x(h_k(t), t) = \sum_{i,j} a_{ij} h_k^i(t) t^j$$

By comparing coefficients of both the sides for each power of t, simultaneous linear equations of $a_{ij}$ are obtained. Since the simultaneous linear equations have a solving method in the polynomial time, all $a_{ij}$ values are obtained in the polynomial time. Likewise, since $b_{ij}$ values are calculated in the polynomial time, it is proved that the sections of the 3D manifold A(x, y, s, t) can be obtained in the polynomial time.

Conversely, assume that polynomial time algorithm β which obtains the 2D sections of the 3D manifold exists. At this time, it will be proved that a practical pair of plaintext and signature by the digital signature of this embodiment can be calculated using this algorithm β in the polynomial time.

If the 3D manifold A(x, y, s, t) as a public key of the digital signature of this embodiment is given, its 2D section:

$$D:(w_x(s,t), w_y(s,t), s, t)$$

is calculated using algorithm β. When plaintext m is appropriately determined, and its hash value polynomial is h(t), s=h(t) is set to obtain a signature:

$$D_s:(w_x(h(t),t), w_y(h(t),t), t)$$

In this manner, a practical pair of plaintext and signature can be calculated within the polynomial time. As described above, the theorem has been proved.

(5) Variations

Variations of this embodiment will be described below. The first variation is the one which replaces a hash value polynomial by a hash value itself. In the digital signature generation processing of this embodiment, a hash value h(m) is calculated from plaintext m, is expanded to a hash value polynomial h(t), and is substituted as s=h(t) in randomly selected section $D_i$.

However, an embodiment which does not embed any hash value in a hash value polynomial is also achievable. That is, the hash value h(m) itself is substituted in a section $D_i$ as s=h(m) to generate a digital signature:

$$D_s:(w_x(h(m),t), w_y(h(m),t), t)$$

In this case, in the digital signature verification processing, substitution of s=h(m) to the 3D manifold A(x, y, s, t) as the public key is made, thus allowing signature verification by the same means.

It can be understood that this variation can be achieved in practice if the hash value polynomial h(t) of this embodiment is considered as a polynomial including only constant terms. That is, this variation can be considered as a special case of this embodiment. By utilizing this variation, polynomial operations in the digital signature generation processing and digital signature verification processing can be lessened, thus reducing the computation memory size and computation processing time. However, at the same time, since the hash value requires 120 bits in minimum, the size of p of $F_p$ as a definition field must be increased to as large as about 120 bits, and a weakness, i.e., requirement of multiple-precision calculation, is also provided, thus limiting the effective application range.

The second variation is the one associated with a change in variable in which the hash value polynomial is substituted in a digital signature generation apparatus and digital signature verification apparatus of this embodiment. In the digital signature generation apparatus and digital signature verification apparatus of this embodiment, a 1-variable polynomial for a variable t, i.e., h(t), is adopted as the hash value polynomial, and is substituted in a variable s of the section as the secret key or the 3D manifold as the public key. Even when the following change is adopted, the invention is similarly achieved while guaranteeing security as well.

That is, a 1-variable polynomial for a variable s, i.e., h(s), is adopted as the hash value polynomial, and is substituted in variable t of the section as the secret key or the 3D manifold as the public key. Since both variables s and t are parameters, the effect of this embodiment remains the same in this variation.

(6) Arrangement

Examples of the arrangements of a key generation apparatus, digital signature generation apparatus, and digital signature verification apparatus according to the digital signature scheme of this embodiment, and their processing operations will be described below.

Figure 3:
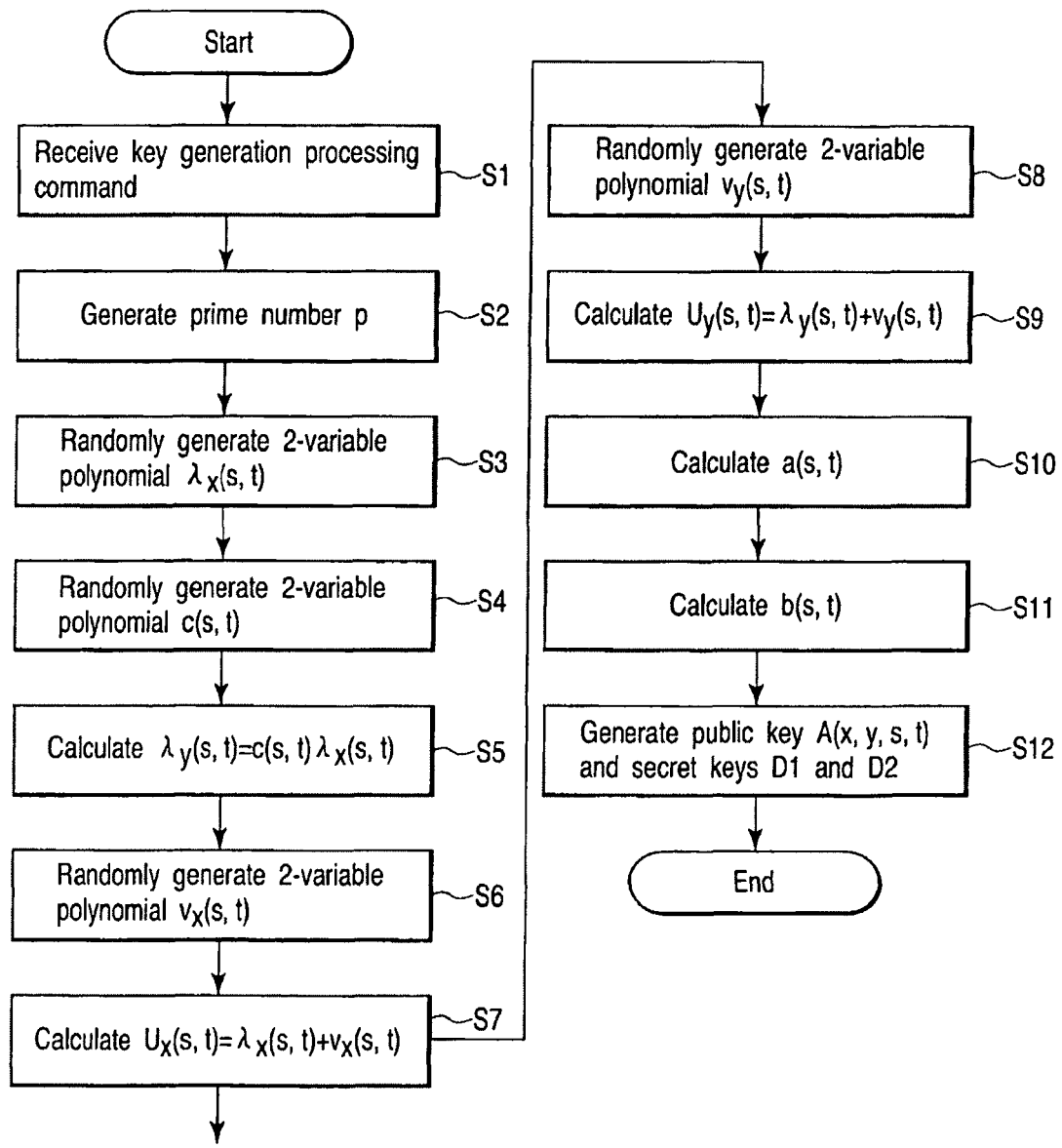
FIG. 3 is a flowchart for explaining the processing operation of the key generation apparatus shown in FIG. 2.

FIG. 2 is a block diagram showing an example of the arrangement of the key generation apparatus, and FIG. 3 is a flowchart for explaining the processing operation of the key generation apparatus. The arrangement and processing operation of the key generation apparatus shown in FIG. 2 will be described below with reference to the flowchart shown in FIG. 3. Note that practical numerical values and equations are presented to help understand the invention. However, these numerical values and equations are merely an example to help understand the Invention, and do not always match a digital signature (especially in terms of the degrees of polynomials and the like) which is used in practice and has sufficiently high security.

Note that the aforementioned 3D-manifold having the fiberation given by $y^2=x^3+a(s, t)x+b(s, t)$ will be taken as an example in the following description.

A key generation processing start command is sent from an external apparatus or the like to a control unit 1, and the key generation apparatus starts key generation processing (step S1). Upon reception of the command, the control unit 1 requests a prime number generation unit 2 to generate a prime number. In prime number generation, a prime number may be randomly generated. However, since a large prime number need not be used, a prime number may be selected from those of about 6 bits at most randomly or arbitrarily (by means of determining the output order in advance), or a prime number determined in advance in the key generation apparatus may be used. Assume that a prime number p=17 is generated in this case (step S2).

The control unit 1 outputs the prime number p to a section generation unit 5, which starts generation of sections. The section generation unit 5 outputs the prime number p to a polynomial generation unit 3, which generates a 2-variable polynomial $\lambda_x(s, t)$ $(=-s(t-1))$ (step S3). The polynomial generation unit 3 randomly selects a degree within the predetermined range, and can generate coefficients of the 2-variable polynomial having that degree within the range from 0 to p−1 as elements of the finite field $F_p$.

The polynomial generation unit 3 generates $\lambda_x(s, t)$ and outputs it to the control unit 1. Upon reception of $\lambda_x(s, t)$, the control unit 1 executes generation processing of a random 2-variable polynomial c(s, t) to obtain c(s, t) (=s+t) (step S4).

The control unit 1 outputs c(s, t) and $\lambda_x(s, t)$ to a polynomial calculation unit 4.

The polynomial calculation unit 4 calculates $\lambda_y(s, t)=c(s, t)\lambda_x(s, t)$ (step S5) and outputs $\lambda_y(s, t)$ $(=-(s+t)s(t-1))$ to the control unit 1.

Upon reception of $\lambda_y(s, t)$, the control unit 1 randomly generates a 2-variable polynomial $\lambda_x(s, t)$ (=2st) by the same method as in generation of $\lambda_x(s, t)$ (step S6), and outputs $\lambda_x(s, t)$ $(=-s(t-1))$ and $v_x(s, t)$ (−2st) to the polynomial calculation unit 4.

The polynomial calculation unit 4 calculates $u_x(s, t)$ $(=\lambda_x(s, t)+v_x(s, t)=s(t+1))$, and outputs it to the control unit 1 (step S7).

The control unit 1 generates $v_y(s, t)$ $(=2st^2+s+s^2t-s^2-st)$ as in step S6 (step S8), and calculates $u_y(=\lambda_y(s, t)+v_y(s, t)=s(t^2+1))$ (step S9).

The control unit 1 outputs $u_x(s, t)$, $u_y(s, t)$, $v_x(s, t)$, and $v_y(s, t)$ to a manifold generation unit 6.

The manifold generation unit 6 calculates a 2-variable polynomial a(s, t) for parameters s and t of the 3D manifold A(x, y, s, t): $y^2=x^3+a(s, t)x+b(s, t)$ using equation (4) by repetitively using the polynomial calculation unit 4 (step S10).

In this example, the calculation result is:

$$a(s,t)=14s^2t_2+s^2+s^3t+16s^3+11s^2t+3st^3+2st+16st^2$$

Furthermore, the manifold generation unit 6 calculates a 2-variable polynomial b(s, t) for parameters s and t from a(s, t), $u_x(s, t)$, $u_y(s, t)$, $v_x(s, t)$, and $v_y(s, t)$ using equation (5) by repetitively using the polynomial calculation unit 4 (step S11).

In this example, the calculation result is:

$$b(s,t)=15s^2t^4+s^2t^2+s^2+2s^3t^3+6s^3t^2+2s^3t+15s^3+16s^4t^2+s^4+15s^2t^3+15s^2t$$

The manifold generation unit 6 outputs the obtained a(s, t) and b(s, t) to the control unit 1.

The control unit 1 substitutes a(s, t) and b(s, t) obtained in steps S10 and S11 in the polynomial $y^2=x^3+a(s, t)x+b(s, t)$ which represents the 3D manifold A(x, y, s, t), thus generating a polynomial of fiberation A(x, y, s, t) of the 3D manifold A as a public key, as indicated by equation (9).

Also, the control unit 1 generates section D1: (x, y, s, t) having the 2-variable polynomial $u_x(s, t)$ as the x-coordinate and the 2-variable polynomial $u_y(s, t)$ as the y-coordinate, and section D2: (x, y, s, t) having the 2-variable polynomial $v_x(s, t)$ as the x-coordinate and the 2-variable polynomial $v_y(s, t)$ as the y-coordinate, as indicated by equations (10) (step S12).

$$A(x,y,s,t){:}y^2-x^3-(14s^2t^2+s^2+s^3t+16s^3+11s^2t+3st^3+2st+16st^2)x-(15s^2t^4+s^2t^2+s^2+2s^3t^3+6s^3t^2+2s^3t+15s^3+16s^4t^2+s^4+15s^2t^3+15s^2t)=0 \quad (9)$$

$$D_1{:}(u_x(s,t),u_y(s,t),s,t)=(s(t+1),s(t^2+1),s,t)$$

$$D_2{:}(v_x(s,t),v_y(s,t),s,t)=(2st,2st^2+s+s^2t-s^2-st,s,t) \quad (10)$$

The control unit 1 outputs the generated public key and secret key to a key output unit 7, which outputs the public key and secret key.

Figure 10:
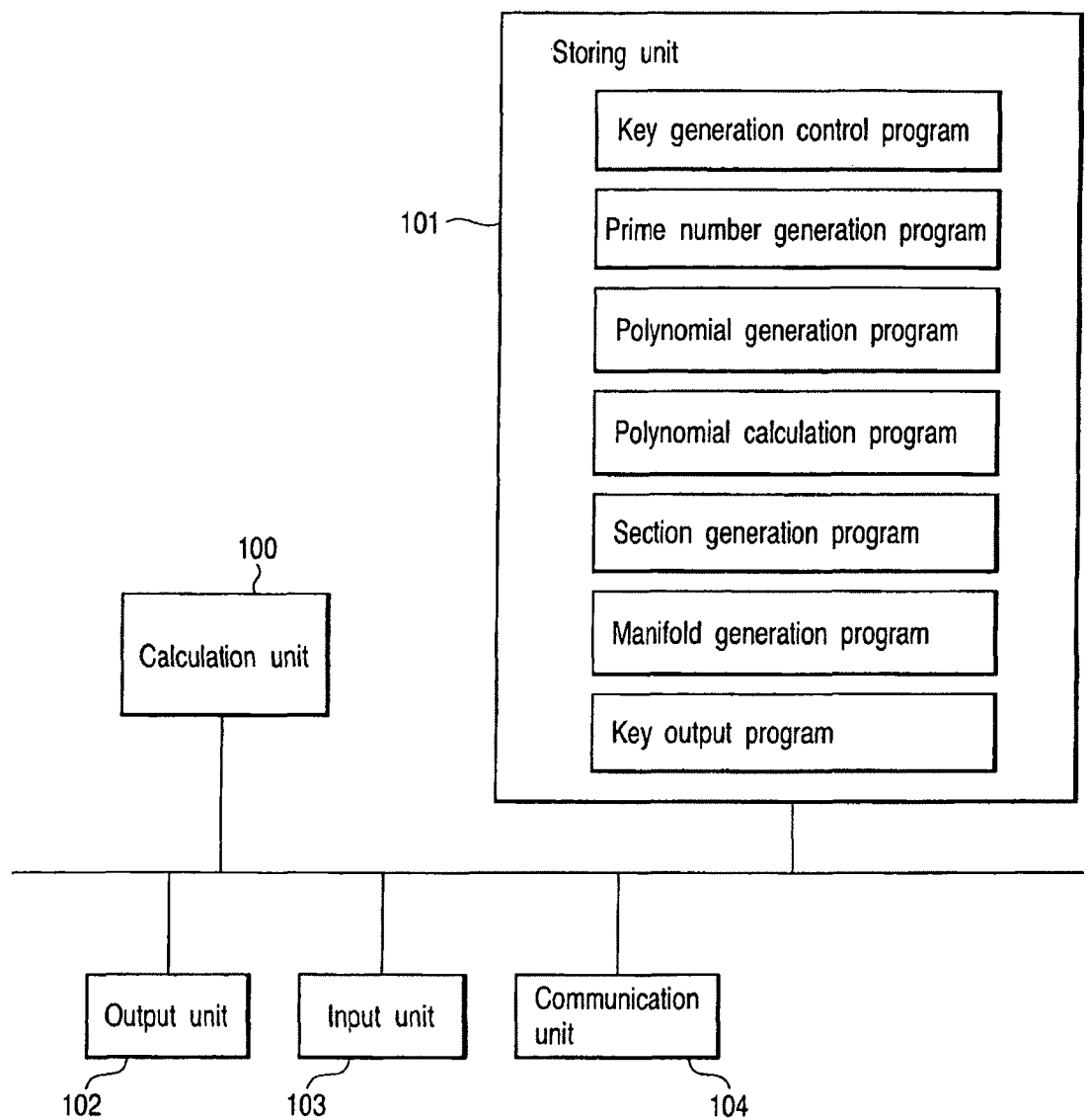
FIG. 10 is a block diagram showing another example of the arrangement of the key generation apparatus shown in FIG. 2.

Note that the respective functions (control unit 1, prime number generation unit 2, polynomial generation unit 3, polynomial calculation unit 4, section generation unit 5, manifold generation unit 6, key output unit 7, and the like) shown in FIG. 2 can be implemented when a computer, which comprises a storing unit (for example a memory) 101 that stores various programs and the like, a calculation unit 100 such as a CPU or the like, an output unit 102, an input unit 103, a communication unit 104, and the like that are connected via a bus, executes programs stored in the memory 101, as shown in FIG. 10.

In FIG. 10, the memory 101 stores a key generation control program, prime number generation program, polynomial generation program, polynomial calculation program, section generation program, manifold generation program, and key output program which are used to implement the functions of the control unit 1, prime number generation unit 2, polynomial generation unit 3, polynomial calculation unit 4, section generation unit 5, manifold generation unit 6, and key output unit 7.

The secret key and public key output from the key output unit 7 in FIG. 2 are sent to a request source via, e.g., the communication unit 104, or are passed to a digital signature generation apparatus and digital signature verification apparatus (to be described later).

Figure 4:
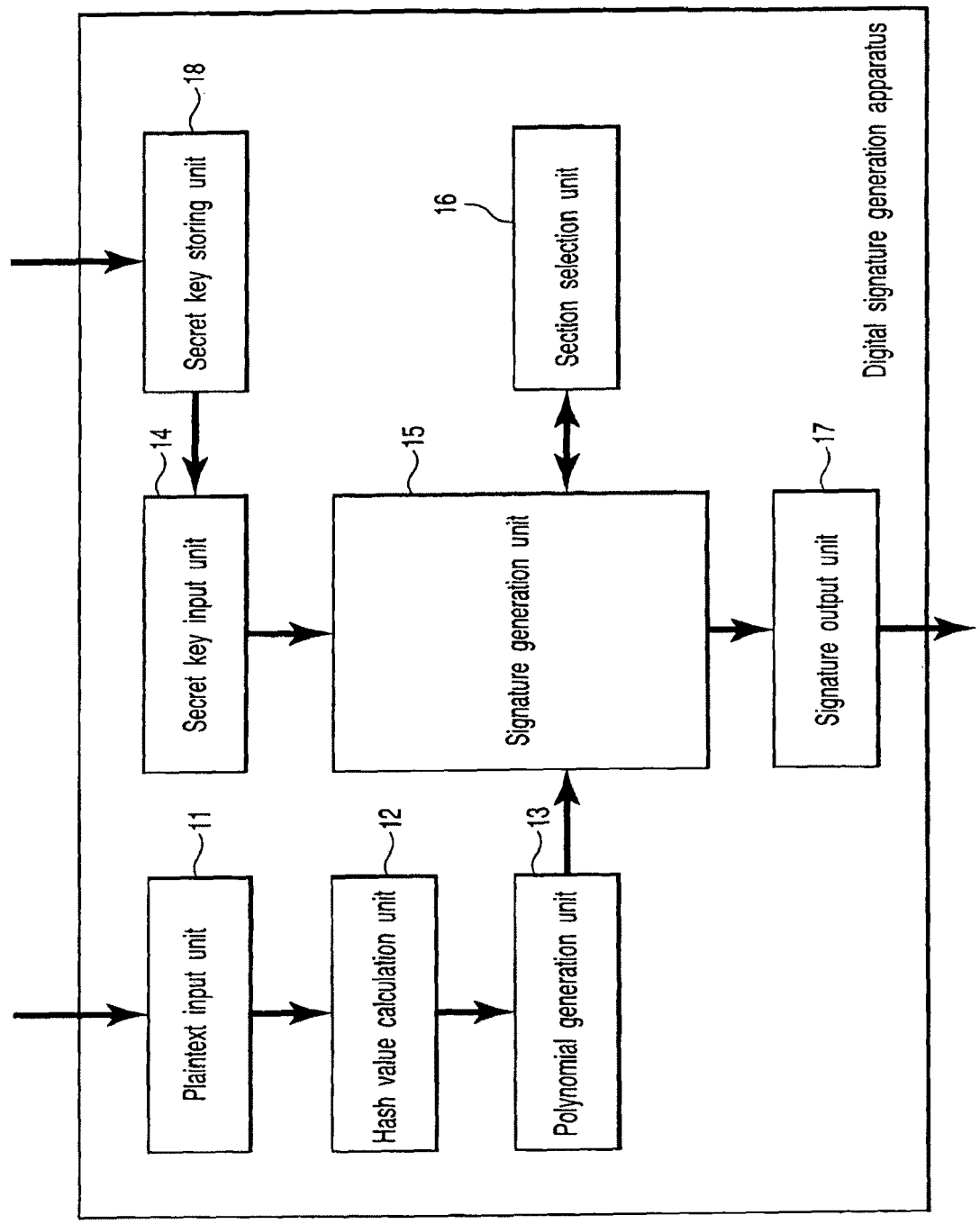
FIG. 4 is a block diagram showing an example of the arrangement of a digital signature generation apparatus.
Figure 5:
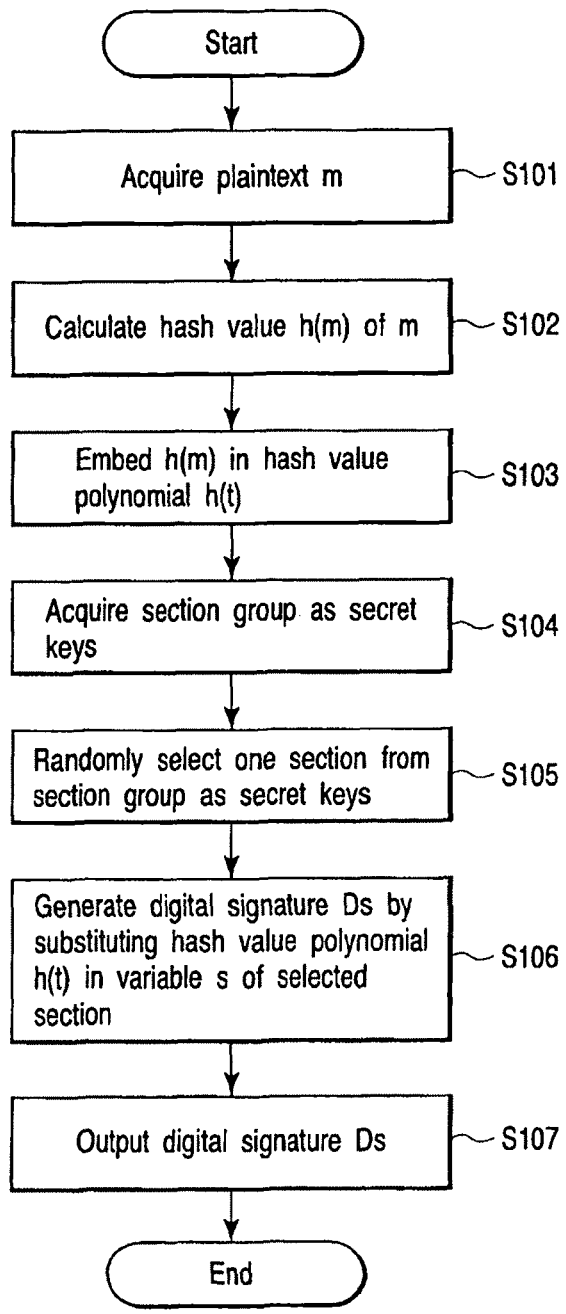
FIG. 5 is a flowchart for explaining the processing operation of the digital signature generation apparatus shown in FIG. 4.

FIG. 4 is a block diagram showing an example of the arrangement of a digital signature generation apparatus, and FIG. 5 is a flowchart for explaining the processing operation of the digital signature generation apparatus shown in FIG. 4. The arrangement and processing operation of the digital signature generation apparatus shown in FIG. 4 will be described below with reference to the flowchart shown in FIG. 5.

The digital signature generation-apparatus shown in FIG. 4 acquires plaintext m from a plaintext input unit 11, and acquires section group Di ($u_x(s, t)$, $u_y(s, t)$, s, t) (0≤i≤n) as the secret key from a secret key input unit 14.

As the secret key,
1. the characteristic p=17 of the prime number
2. two sections, given by equations (10), of the 3D manifold A defined on the finite field $F_p$ which are generated by the aforementioned key generation processing are used. Note that all calculations are made on a finite field $F_{17}$ determined by the key generation processing.

When the plaintext m is input from the plaintext input unit 11, digital signature generation processing starts (step S101). The input plaintext m is output to a hash value calculation unit 12, which calculates a hash value h(m) using a hash function such as SHA1, MD5, or the like (step S102). In this example, the hash value is "0x151" for the sake of simplicity, but it must actually have 120 bits or more. The calculated hash value is sent to a polynomial generation unit 13, and is divided into a plurality of predetermined blocks. In this example, since p=17, the hash value is divided into 4-bit blocks, and the respective blocks are embedded in the coefficients of a hash value polynomial h(t) (step S103). The hash value polynomial h(t) obtained as a result of this step is $$h(t)=t^2+5t+1.$$

A secret key storing unit 18 stores at least one section as a secret key, which is generated by the key generation apparatus with the arrangement shown in FIG. 2 or FIG. 8 (to be described later).

The secret key input unit 14 reads out a section group as the secret keys from the secret key storing unit 18 and outputs it to a signature generation unit 15 (step S104). The secret key storing unit 18 preferably stores a plurality of sections. In this example, the secret key storing unit 18 stores two sections D1 and D2 given by equations (10), and the secret key input unit 14 reads out these two sections D1 and D2 from the secret key storing unit 18 and outputs them to the signature generation unit 15. These sections are output from the signature generation unit 15 to a section selection unit 16. The section selection unit 16 randomly selects one of the input sections (step S105). Assume that D1 is selected in this example. The selected section D1 is output to the signature generation unit 15. Note that when the secret key storing unit 18 stores only one secret key, the above processing of the section selection unit 16 is skipped.

Upon reception of the selected section D1, the signature generation unit 15 acquires the hash value polynomial h(t) generated in step S103 from the polynomial generation unit 13, and substitutes h(t) in the s-coordinate of the selected section D1 (s=h(t)), thereby generating section $D_s$ (step S106).

In this case, a section $D_s$ given by:

$$D_s(U_x(t),U_y(t),t)=(t^3+6t^2+6t+1, t^4+5t^3+2t^2+5t+1, t) \quad (11)$$

is generated in this example.

This section $D_s$ is output from a signature output unit 17 as a digital signature (step S107).

The aforementioned first and second variations are achieved by the same processing in this embodiment. When the first variation is utilized, p must be set to have 120 bits or more under the present situation (in consideration of the size of the hash value).

Figure 11:
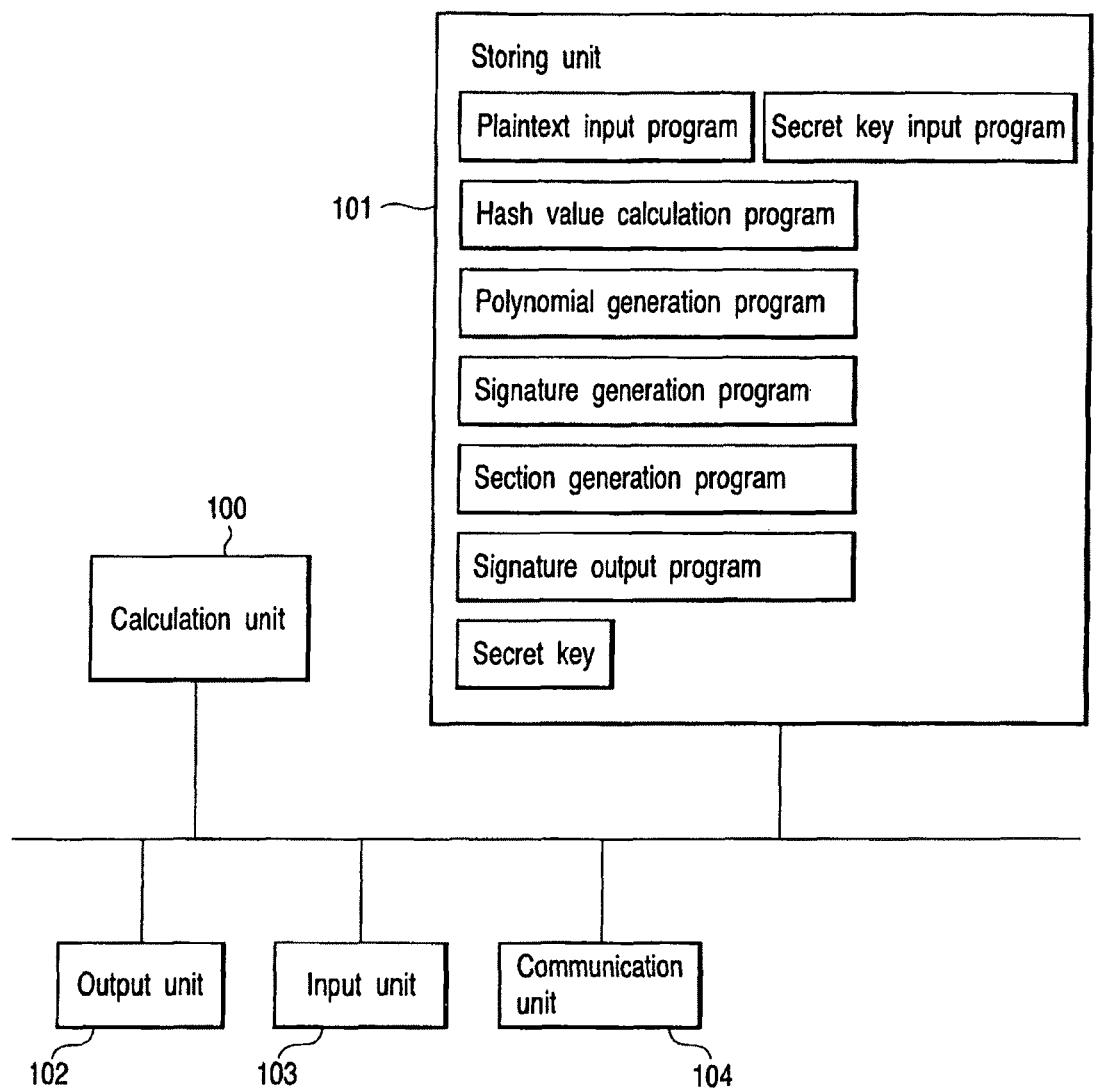
FIG. 11 is a block diagram showing another example of the arrangement of the digital signature generation apparatus shown in FIG. 4.

Note that respective functions (plaintext input unit 11, hash value calculation unit 12, polynomial generation unit 13, secret key input unit 14, signature generation unit 15, section selection unit 16, signature output unit 17, and the like) shown in FIG. 4 can be implemented when a computer, which comprises a memory 101 that stores various programs and the like, a calculation unit 100 such as a CPU or the like, an output unit 102, an input unit 103, a communication unit 104, and the like that are connected via a bus, executes programs stored in the memory 101, as shown in FIG. 11.

In FIG. 11, the memory 101 stores a plaintext input program, hash value calculation program, polynomial generation program, secret key input program, signature generation program, section selection program, and signature output program which are respectively used to implement the functions of the plaintext input unit 11, hash value calculation unit 12, polynomial generation unit 13, secret key input unit 14, signature generation unit 15, section selector 16, and signature output unit 17. The memory 101 also serves as the secret key storing unit 18 that stores the secret key.

The message m input by the plaintext input unit 11 and the digital signature output from the signature output unit 17 are sent to, e.g., a partner terminal via the communication unit 104.

Figure 6:
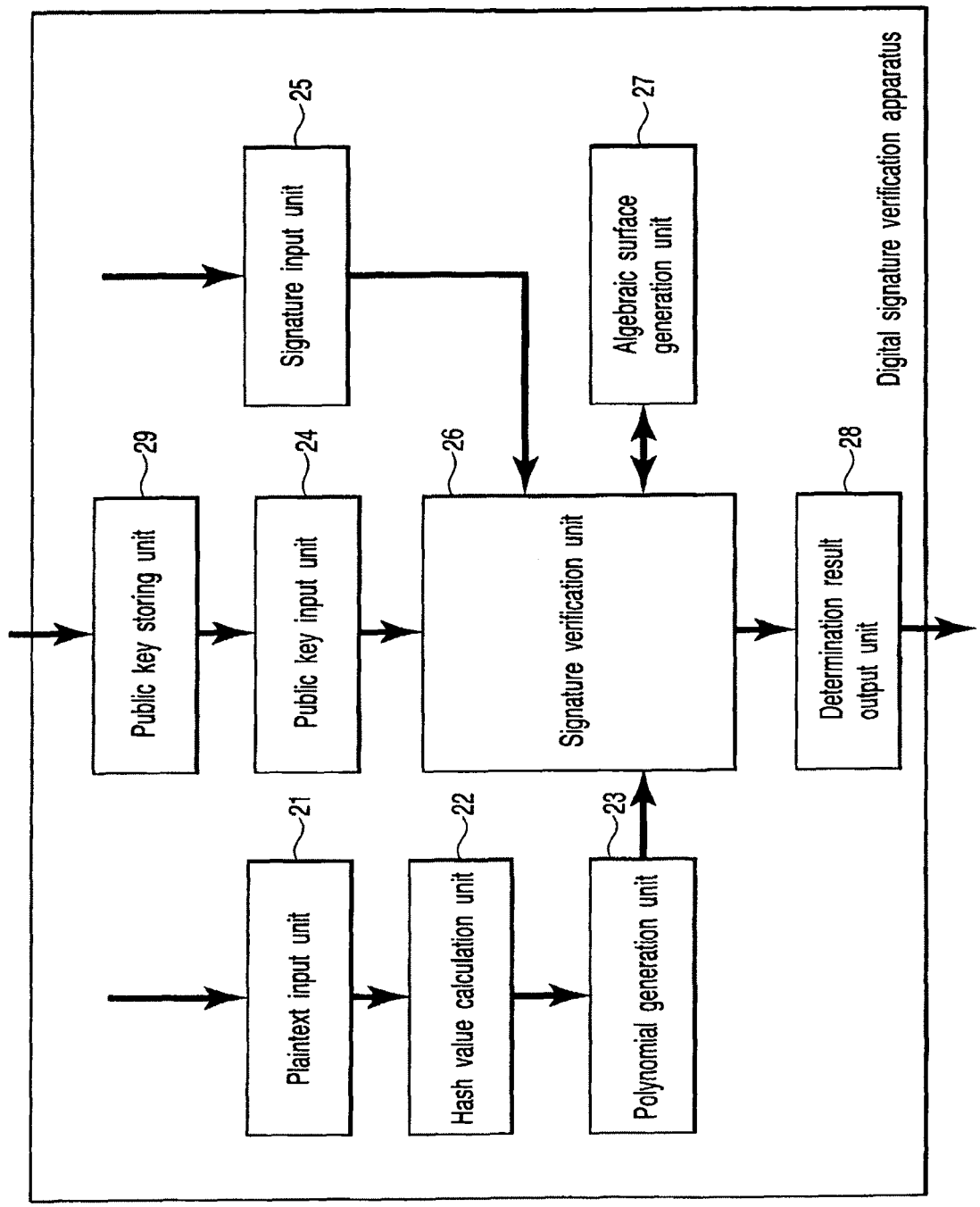
FIG. 6 is a block diagram showing an example of the arrangement of a digital signature verification apparatus.
Figure 7:
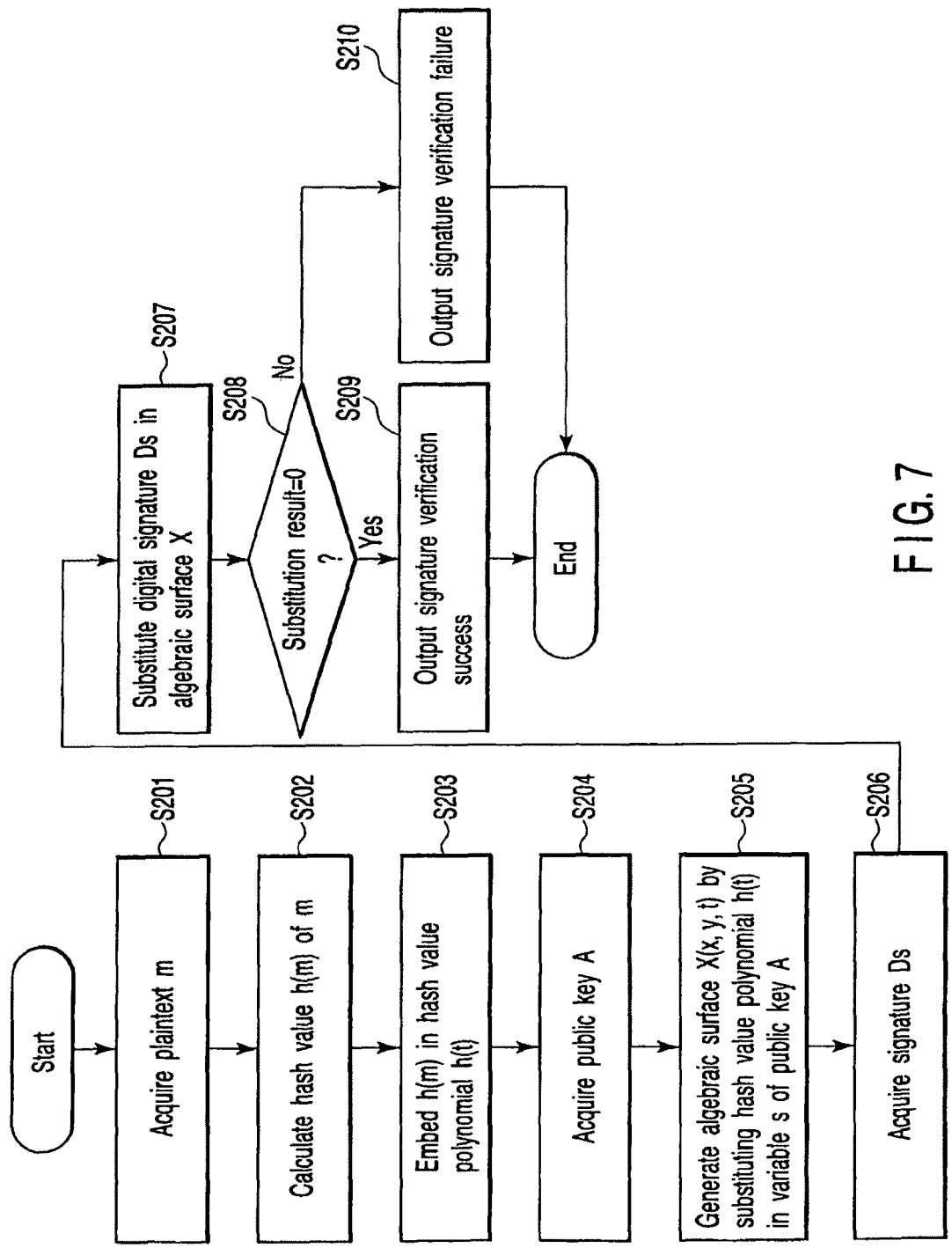
FIG. 7 is a flowchart for explaining the processing operation of the digital signature verification apparatus shown in FIG. 6.

FIG. 6 is a block diagram showing an example of a digital signature verification apparatus, and FIG. 7 is a flowchart for explaining the processing operation of the digital signature verification apparatus shown in FIG. 6. The arrangement and processing operation of the digital signature verification apparatus shown in FIG. 6 will be described below with reference to the flowchart shown in FIG. 7.

The digital signature verification apparatus shown in FIG. 6 acquires plaintext m from a plaintext input unit 21, and acquires a 3D manifold A(x, y, s, t) defined on the finite field $F_p$ as the public key from a public key input unit 24.

When plaintext m is input from the plaintext input unit 21, digital signature verification processing starts (step S201).

The input plaintext m is output to a hash value calculation unit 22, and a hash value is calculated using the same hash function as that used in the signature generation apparatus (step S202). In this example, the hash value is "0x151" as that output by the signature generation apparatus. This hash value is output to a polynomial generation unit 23.

The polynomial generation unit 23 calculates a hash value polynomial h(t) by the same algorithm as in the digital signature generation apparatus (step S203). Therefore, the hash value polynomial h(t) obtained in this step is $h(t)=t^2+5t+1$.

The obtained hash value polynomial h(t) is output to a signature verification unit 26.

A public key storing unit 29 stores the polynomial of the 3D manifold A(x, y, s, t) defined on the finite field $F_p$ as the public key generated by the key generation apparatus with the arrangement shown in FIG. 2 or FIG. 8 (to be described later).

The public key input unit 24 reads out the polynomial of the 3D manifold as the public key from the public key storing unit 29, and outputs it to the signature verification unit 26 (step S204). In this example, the 3D manifold given by equation (9), i.e., the public key is input to the signature verification unit 26. The signature verification unit 26 outputs the input public key to an algebraic surface generation unit 27.

The signature verification unit 26 outputs the hash value polynomial h(t) generated in step S203 to the algebraic surface generation unit 27.

The algebraic surface generation unit 27 substitutes the hash value polynomial h(t) output from the signature verification unit 26 in variable s of the 3D manifold to generate algebraic surface X(x, y, t) (step S205). In this case, algebraic surface X(x, y, t) given by:

$$X(x,y,t)=10t^2+13t^4+y^2+16x^3+4xt^5+15xt^4+4xt^3+8xt+16xt^7+6xt^6+5xt^2+10t^6+10t^5+8t^7+t^9+t^{10} \quad (12)$$

is obtained.

Next, the signature verification unit 26 loads the signature $D_s$: $(U_x(t), U_y(t), t)$ which is given by equation (11) and is input to a signature input unit 25 (step S206). The x-coordinate $U_x(t)=t^3+6t^2+6t+1$ and the y-coordinate $U_y(t)=t^4+5t^3+2t^2+5t+1$ of the $D_s$ are substituted in the x- and y-coordinates of algebraic surface X given by equation (12), and are expanded and arranged (step S207). As described above, since the digital signature $D_s$ is a divisor of algebraic surface X, substituting and arranging should yield "0". Therefore, if the substitution result becomes "0" (step S208), "signature verification success" is output to a determination result output unit 28 (step S209). However, if the substitution result does not become "0", since it means that the digital signature is wrong (step S208), "signature verification failure" is output to the determination result output unit 28 (step S210).

The determination result output unit 28 externally outputs the determination result, thus ending all the processes.

In the example described above, since the digital signature is authentic, the result obtained by substituting the digital signature $D_s$ in algebraic surface X and arranging it surely becomes "0", and the signature verification unit outputs "signature verification success" to the determination result output unit 28, which externally outputs it, thus ending the processing.

The first and second variations are achieved by the same processing in this embodiment.

Figure 12:
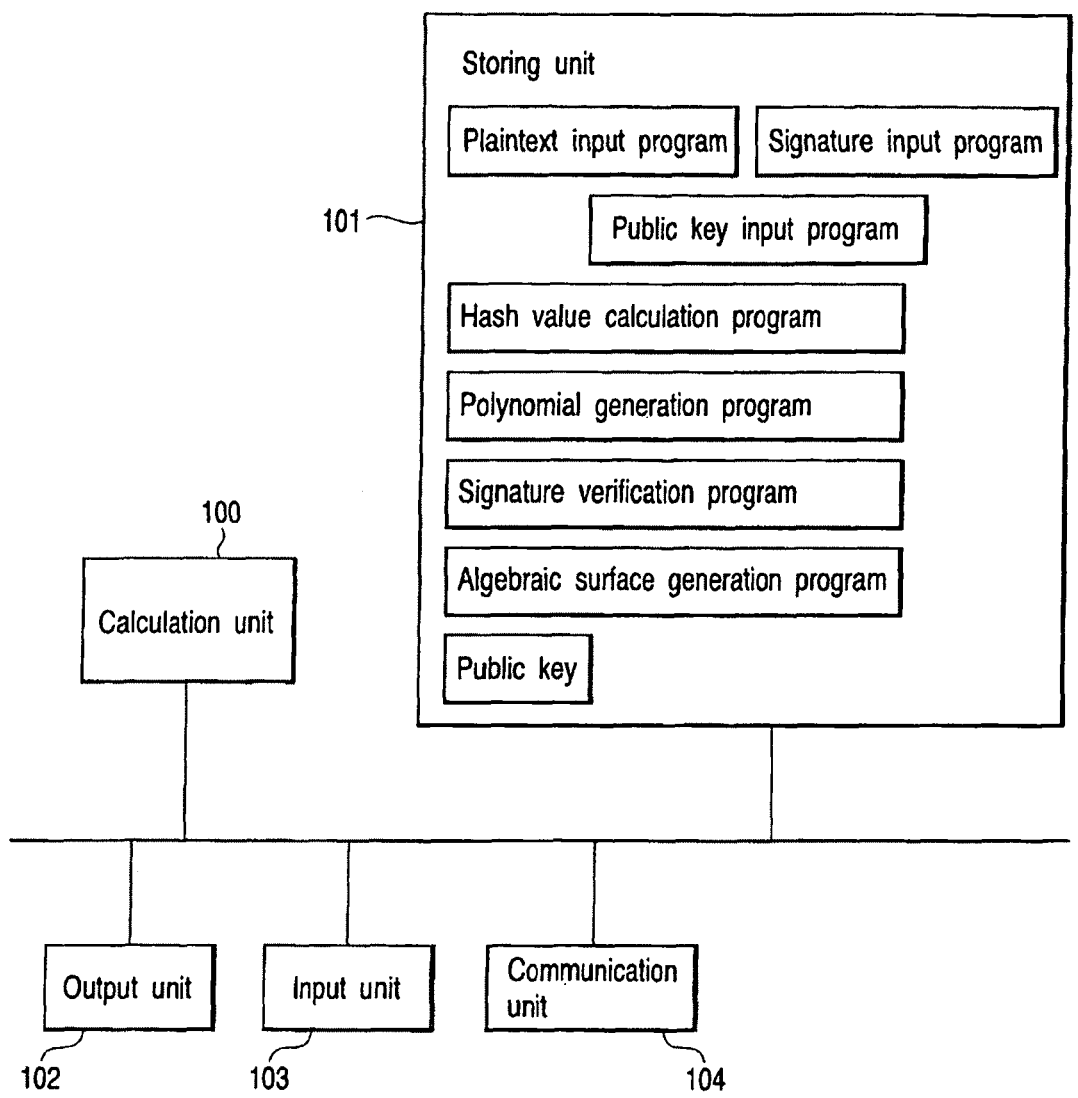
FIG. 12 is a block diagram showing another example of the arrangement of the digital signature verification apparatus shown in FIG. 6.

Note that respective functions (plaintext input unit 21, hash value calculation unit 22, polynomial generation unit 23, public key input unit 24, signature input unit 25, signature verification unit 26, algebraic surface generation unit 27, determination result output unit 28, and the like) shown in FIG. 6 can be implemented when a computer, which comprises a memory 101 that stores various programs and the like, a calculation unit 100 such as a CPU or the like, an output unit 102, an input unit 103, a communication unit 104, and the like that are connected via a bus, executes programs stored in the memory 101, as shown in FIG. 12.

In FIG. 12, the memory 101 stores a plaintext input program, hash value calculation program, polynomial generation program, public key input program, signature input program, signature verification program, algebraic surface generation program, and determination result output program which are respectively used to implement the functions of the plaintext input unit 21, hash value calculation unit 22, polynomial generation unit 23, public key input unit 24, signature input unit 25, signature verification unit 26, algebraic surface generation unit 27, and determination result output unit 28. Also, the memory 101 serves as the public key storing unit 29.

To the signature input unit 25, a digital signature corresponding to message m generated by the digital signature generation apparatus is input.

The second key generation method will be described below. FIG. 8 is a block diagram showing an example of the arrangement of a key generation apparatus using the second key generation method, and FIG. 9 is a flowchart for explaining the processing operation of the key generation apparatus in FIG. 8. The arrangement and processing operation of the key generation apparatus in FIG. 8 will be described below with reference to the flowchart shown in FIG. 9.

A key generation processing start command is sent from an external apparatus or the like to a control unit 1, and the key generation apparatus starts key generation processing (step S301). Upon reception of the command, the control unit 1 requests a prime number generation unit 2 to generate a prime number. In prime number generation, a prime number may be randomly generated. However, since a large prime number need not be used, a prime number may be selected from those of about 6 bits at most randomly or arbitrarily (by means of determining the output order in advance), or a prime number determined in advance in the key generation apparatus may be used. Assume that a prime number p=17 is generated in this case (step S302).

The control unit 1 sends the prime number p to a section generation unit 5, which starts generation of sections. The section generation unit 5 determines x-coordinates $u_{x,i}(s,t)$ and y-coordinates $u_{y,i}(s,t)$ of n sections:

$$Di(x,y,s,t)=(u_{x,i}(s,t),u_{y,i}(s,t),s,t) \quad (1 \leq i \leq n)$$

by the method to be described below.

Initially, a maximum value $h_x$ of a degree associated with s of the x-coordinate, and a maximum value $k_x$ of a degree associated with t are determined (step S303). That is, $$h_x=\max\{\deg_s(u_{x,i}(s,t)|1 \leq i \leq n\}$$

$$k_x=\max\{\deg_t(u_{x,i}(s,t)|1 \leq i \leq n\}$$

In this example, $h_x=k_x=2$ for the sake of simplicity.

Next, the control unit 1 requests a polynomial generation unit 3 to generate x-coordinates $u_{x,i}(s,t)$ of sections Di within the range of this degree which include the term $s^{h_x}t^{k_x}$. Since n=3, the polynomial generation unit 3 randomly and sequentially determines $u_{x,1}(s,t)$, $u_{x,2}(s,t)$, and $u_{x,3}(s,t)$ (step S304). That is, we can obtain:

$$u_{x,1}(s,t)=2s^2t^2+3s^2t+5s+7$$

$$u_{x,2}(s,t)=6s^2t^2+4s^2t+7s+1$$

$$u_{x,3}(s,t)=8s^2t^2+s^2t+7st^2+4$$

Next, a maximum value $h_y$ of a degree associated with s of the y-coordinate, and a maximum value $k_y$ of a degree associated with t are determined (step S305) as in step S303. That is, $$h_y=\max\{\deg_s(u_{y,i}(s,t)|1 \leq i \leq n\}$$

$$k_y=\max\{\deg_t(u_{y,i}(s,t)|1 \leq i \leq n\}$$

In this example, $h_y=k_y=2$ for the sake of simplicity.

Next, the control unit 1 requests the polynomial generation unit 3 to generate y-coordinates $u_{y,i}(s,t)$ of sections Di within the range of this degree which include the term $s^{h_y}t^{k_y}$. Since n=3, the polynomial generation unit 3 randomly and sequentially determines $u_{y,1}(s,t)$, $u_{y,2}(s,t)$, and $u_{y,3}(s,t)$ (step S306). That is, we can obtain:

$u_{y,1}(s,t)=3s^2t^2+10st+2$ $u_{y,2}(s,t)=9s^2t^2+9st+7s+4$ $u_{y,3}(s,t)=4s^2t^2+7st+4s+5t+1$

As described above, sections Di are generated.

These sections are output to the control unit 1. The control unit 1 outputs these sections to a manifold generation unit 6 to control it to generate a 3D manifold.

The manifold generation unit 6 converts the input $u_{x,i}(s, t)$ and $u_{y,i}(s, t)$ into factors like x-factors $(x-u_{x,i}(s, t))$ and y-factors $(y-u_{y,i}(s, t))$ (step S307).

Then, x-factors $(x-u_{x,i}(s, t))$ and y-factors $(y-u_{y,i}(s, t))$ whose i assume the identical values are randomly distributed to the left-hand side and right-hand side. The product of n factors distributed to the left-hand side, and that of n factors distributed to the right-hand side are coupled via an equal sign, thus generating a 4-variable (x, y, s, t) polynomial given by:

$$(x-u_{x,1}(s,t))(y-u_{y,2}(s,t))(x-u_{x,3}(s,t))=(y-u_{y,1}(s,t)(x-u_{x,2}(s,t))(y-u_{y,3}(s,t)) \quad (13)$$

The manifold generation unit 6 requests a polynomial calculation unit 8 to expand equation (13) above via the control unit 1 (or directly).

The polynomial calculation unit 8 expands equation (13) above to hold the respective terms included in the 4-variable polynomial to one of the left-hand side and right-hand side to obtain a 3D manifold A(x, y, s, t) (step S308) which is given by:

$$\begin{aligned}A(x,y,s,t)=&9+2s^2t^2+10t+s+s^2+11s^2t+8x+8y+13xys^2t+\\&10xyst^2+14s^2t^2yx+3s^2t^2y+12st+7st^2+9xy+4xs+\\&13s^4t^4+11s^3t^3+12s^3t^2+5s^4t^3+5xs^2t^2+7xst+7s^2ty+\\&8s^4t^4y+15s^4t^3y+14s^3t^4y+3xs^3t^2+11xs^3t+8x^2s^2t^2+\\&12xs^3t^4+8x^2st+14xs^2t^3+3s^4t^2y+4s^3t^3y+s^3yt^2+\\&6s^3yt+4s^2tx+12xst^2+15yst^2+6s^3t+12sy+7s^3t^4+\\&s^2x+9s^4t^2+16s^4t+13x^2+8s^2t^3+x^2y+10x^2s+13s^6t^6+\\&s^6t^5+10s^5t^6+16s^5t^5+15s^4t^5+15^5t^3+7s^6t^4+13s^5t^2+\\&7sy^2+6s^2y+y^2+12yt+16xy^2+10s^4t^4x+12s^3t^3x+\\&2s^4t^3x+16syx+6s^2t^2y^2+4s^2t^3y+4s^2ty^2+5xyt+\\&16syt+7xt\end{aligned} \quad (14)$$

The polynomial calculation unit 8 outputs the obtained 3D manifold A(x, y, s, t) to the control unit 1. The control unit 1 outputs the three sections and 3D manifold A(x, y, s, t) as keys to a key output unit 7, which outputs these keys.

Figure 8:
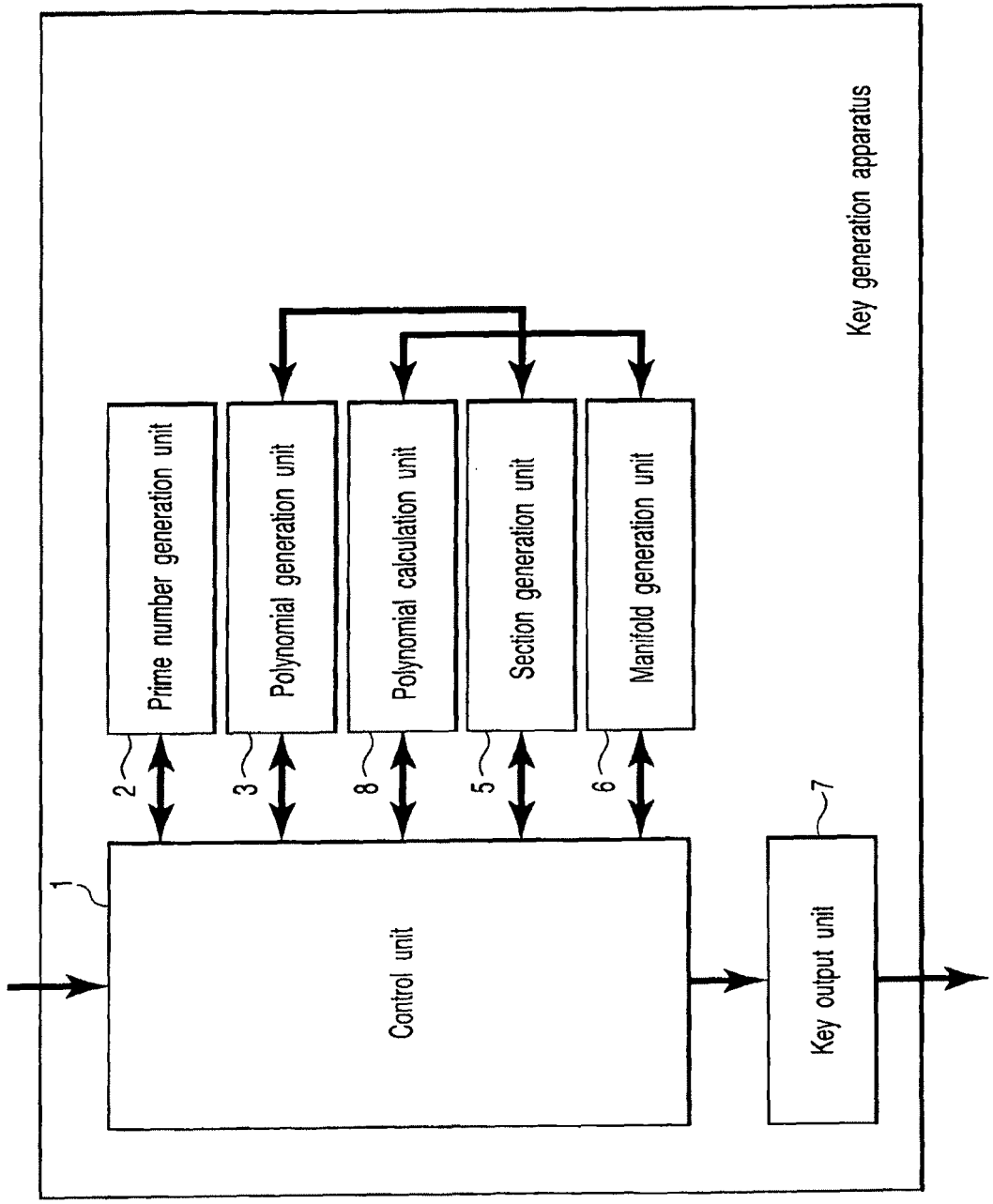
FIG. 8 is a block diagram showing another example of the arrangement of a key generation apparatus.
Figure 9:
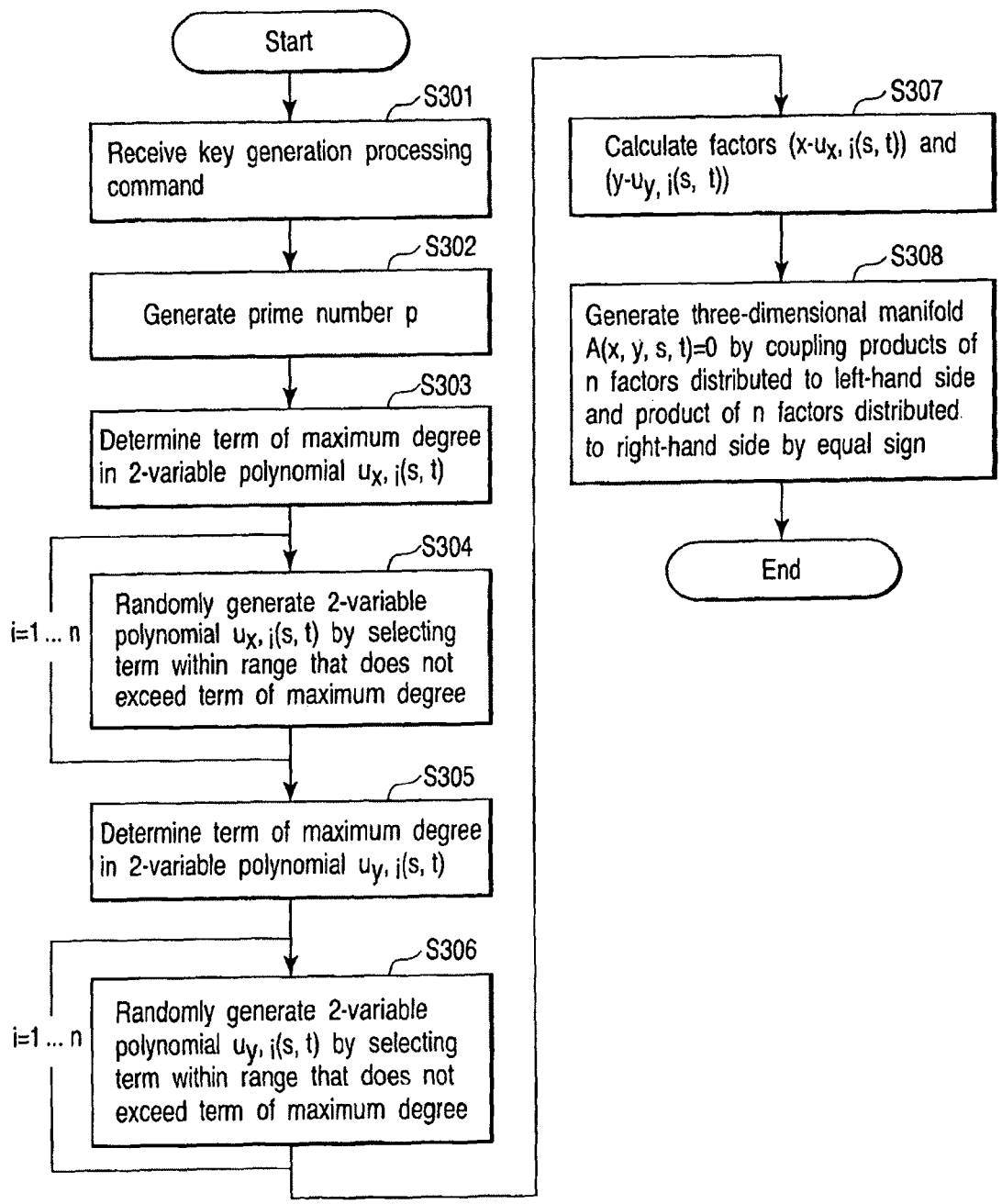
FIG. 9 is a flowchart for explaining the processing operation of the key generation apparatus shown in FIG. 8.
Figure 13:
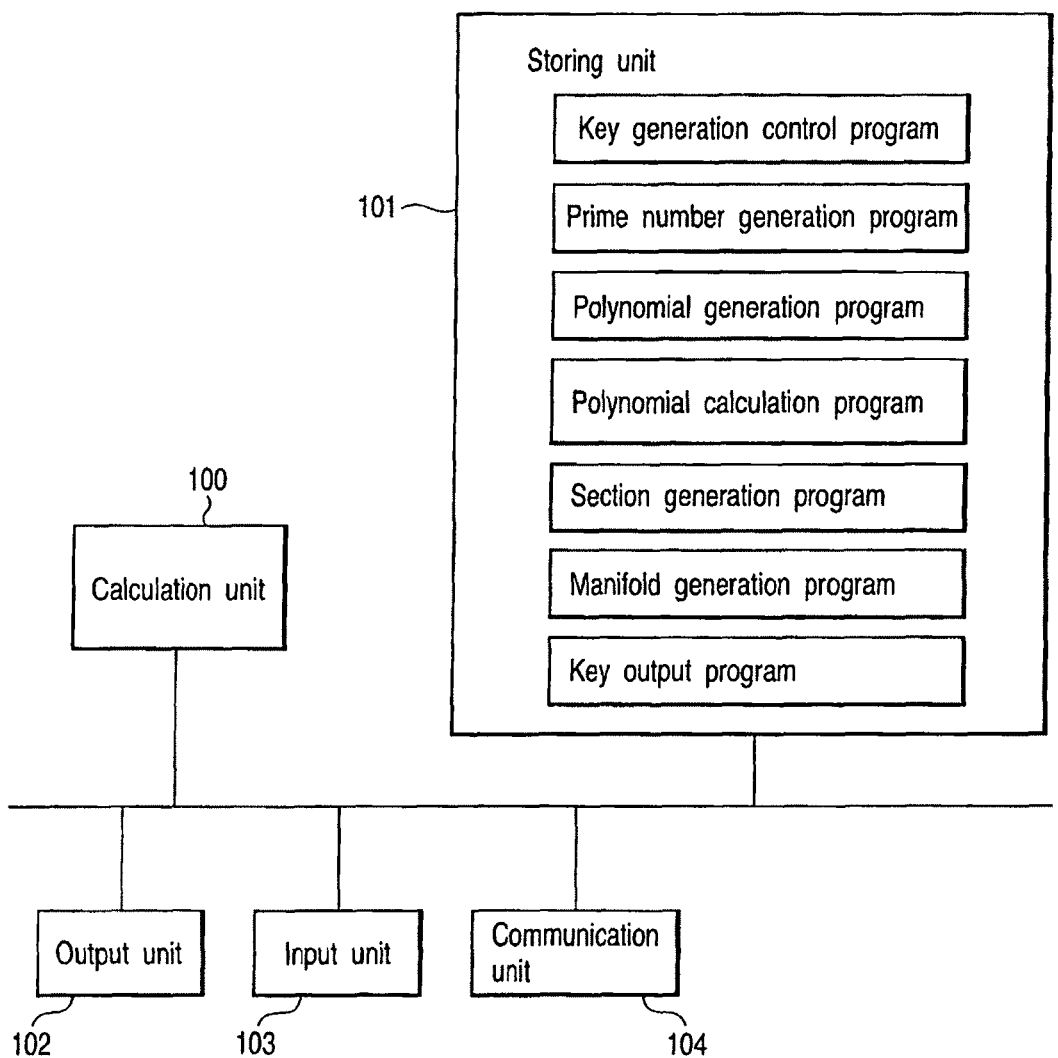
FIG. 13 is a block diagram showing another example of the arrangement of the key generation apparatus shown in FIG. 8.

Note that the respective functions (control unit 1, prime number generation unit 2, polynomial generation unit 3, polynomial calculation unit 8, section generation unit 5, manifold generation unit 6, key output unit 7, and the like) shown in FIG. 8 can be implemented when a computer, which comprises a memory 101 that stores various programs and the like, a calculation unit 100 such as a CPU or the like, an output unit 102, an input unit 103, a communication unit 104, and the like that are connected via a bus, executes programs stored in the memory 101, as shown in FIG. 13.

In FIG. 13, the memory 101 stores a key generation control program, prime number generation program, polynomial generation program, polynomial calculation program, section generation program, manifold generation program, and key output program which are used to implement the functions of the control unit 1, prime number generation unit 2, polynomial generation unit 3, polynomial calculation unit 8, section generation unit 5, manifold generation unit 6, and key output unit 7.

The secret key and public key output from the key output unit 7 in FIG. 8 are sent to a request source via, e.g., the communication unit 104, or are passed to a digital signature generation apparatus and digital signature verification apparatus (to be described later).

The polynomial generation unit 3 of the key generation apparatus shown in FIG. 8 determines the maximum values of the degrees of variables s and t (the maximum degree $h_x$ of variable a of the x-coordinate, the maximum degree $k_x$ of variable t of the x-coordinate, the maximum degree $h_y$ of variable a of the y-coordinate, and the maximum degree $k_y$ of variable t of the y-coordinate) upon generation of a 2-variable polynomial corresponding to the x- and y-coordinates of each section so as to improve the security. Then, the polynomial generation unit 3 generates a 2-variable polynomial which inevitably includes the term $s^{hx}t^{kx}$ for the x-coordinate, and a 2-variable polynomial which inevitably includes the term $s^{hy}t^{ky}$ for the y-coordinate.

However, the embodiment of the invention is not limited to this such case. When a 2-variable polynomial $u_{x,i}(s, t)$ (i: 1≤i≤n) which includes a plurality of monomials each of which has at least one of variable s whose degree is equal to or lower than the maximum value $h_x$ and variable t whose degree is equal to or lower than the maximum value $k_x$ as a factor, and a 2-variable polynomial $u_{y,i}(s, t)$ (i: 1≤i≤n) which includes a plurality of monomials each of which has at least one of variable s whose degree is equal to or lower than the maximum value $h_y$ and variable t whose degree is equal to or lower than the maximum value $k_y$ as a factor, are generated, a 3D manifold having n sections can be generated.

As described above, according to the embodiment, the digital signature generation apparatus on the message-sending side stores a finite field $F_p$ and section $D(u_x(s, t), u_y(s, t), s, t)$, whose x- and y-coordinates are expressed by the functions of parameters s and t, of surfaces of a 3D manifold A(x, y, s, t) which is expressed by the x-coordinate, y-coordinate, parameter s, and parameter t, and is defined on the finite field $F_p$ in a storing unit as a secret key for signature generation. A calculation unit such as a CPU or the like calculates a hash value of message m, and embeds this hash value in coefficients of 1-variable polynomial h(t) defined on the finite field $F_p$ to generate a hash value polynomial. The calculation unit reads out one-section from the storing unit and generates a digital signature using that section as a secret key for signature generation. That is, by substituting the hash value polynomial in the s-coordinate of the section, digital signature $Ds(U_x(t), U_y(t), t)$ as a curve on the section, whose x- and y-coordinate are expressed by the function of parameter t is generated. The digital signature generated in this way is sent to the message receiving side by a sending unit on the message sending side together with the message m.

The storing unit stores a plurality of different sections $Di(u_{x,i}(s, t), u_{y,i}(s, t), s, t)$ (i is an arbitrary positive integer falling within the range 0≤i≤n). Every time a digital signature is generated, one arbitrary section is selected from the plurality of sections $D_i$ stored in the storing unit to generate a digital signature, thus improving security.

The digital signature verification apparatus on the message receiving side stores, in a storing unit, a finite field $F_p$, and a polynomial of a 3D manifold A(x, y, s, t) which is expressed by the x-coordinate, y-coordinate, parameter s, and parameter t, and is defined on the finite field $F_p$, as a public key. Upon reception of message m and digital signature Ds: $(U_x(t), U_y(t), t)$ corresponding to the message m, a calculation unit such as a CPU or the like calculates a hash value of the message m and embeds this hash value in a 1-variable polynomial h(t) defined on the finite field $F_p$ to generate a hash value polynomial. The calculation unit substitutes the hash value polynomial in the s-coordinate of the polynomial of the 3D manifold A(x, y, s, t) as a public key corresponding to the message sending side from the storing unit, thus calculating algebraic surface X(x, y, t) corresponding to the hash value. Furthermore, the calculation unit substitutes the digital signature in algebraic surface X(x, y, t) to verify the authenticity of the message and digital signature. That is, after x-coordinate (expressed by the polynomial of variable t) $U_x(t)$ of the digital signature is substituted in the x-coordinate of algebraic surface X(x, y, t), and y-coordinate (expressed by the polynomial of variable t) $U_y(t)$ of the digital signature is substituted in the y-coordinate of algebraic surface X(x, y, t), the equation is expanded to express the products of polynomials in the form of the sum of monomials) and arranged. As a result, when this result (the substitution result of the x- and y-coordinates of the digital signature in algebraic surface X(x, y, t)) is "0", it is verified that message m has not been falsified, and message m is transmitted from an authentic message sender corresponding to the public key (signature verification success).

In the key generation apparatus, a calculation unit such as a CPU or the like generates a first 2-variable polynomial $\lambda_x(s, t)$ for parameters s and t defined on the finite field $F_p$, and a second 2-variable polynomial $\lambda_y(s, t)$ which is divisible by the first 2-variable polynomial $\lambda_x(s, t)$, and is defined on the finite field $F_p$. Next, the calculation unit generates two 2-variable polynomials $u_x(s, t)$ and $v_x(s, t)$ which is defined on the finite field $F_p$ and whose variable x is expressed by parameters s and t, so that a difference $\{u_x(s, t)-v_x(s, t)\}$ of the two 2-variable polynomials is $\lambda_x(s, t)$. Furthermore, the calculation unit generates two 2-variable polynomials $u_y(s, t)$ and $v_y(s, t)$ which is defined on the finite field $F_p$ and whose variable y is expressed by parameters s and t, so that a difference $\{u_y(s, t)-v_y(s, t)\}$ of the two 2-variable polynomials is $\lambda_y(s, t)$. The calculation unit then generates section D1: (x, y, s, t)=($u_x(s, t)$, $u_y(s, t)$, s, t) which has the 2-variable polynomial $u_x(s, t)$ as the x-coordinate and the 2-variable polynomial $u_y(s, t)$ as the y-coordinate, and section D2: (x, y, s, t)=($v_x(s, t)$, $v_y(s, t)$, s, t) which has the 2-variable polynomial $v_x(s, t)$ as the x-coordinate and the 2-variable polynomial $v_y(s, t)$ as the y-coordinate. These two sections D1 and D2 serve as secret keys. Also, a 3D manifold A(x, y, s, t) having these two sections D1 and D2 is generated. This 3D manifold A serves as a public key.

In another key generation apparatus, a calculation unit such as a CPU or the like generates n (n is a positive integer), first to n-th (n is a positive integer) 2-variable polynomials $u_{x,i}(s, t)$ (i: 1≤i≤n) for parameters s and t defined on the finite field $F_p$, and n (n is a positive integer), first to n-th (n is a positive integer) 2-variable polynomials $u_{y,i}(s, t)$ (i: 1≤i≤n) for parameters s and t defined on the finite field $F_p$. The calculation unit generates i-th section Di: (x, y, s, t)=($u_{x,i}(s, t)$, $u_{y,i}(s, t)$, s, t) (1≤i≤n) which has the generated i-th (1≤i≤n) 2-variable polynomials $u_{x,i}(s, t)$ and $u_{y,i}(s, t)$ as the x- and y-coordinates, thus calculating the n, first to n-th sections Di (1≤i≤n). These n sections serve as secret keys. Furthermore, the calculation unit generates i-th x-factor (x−$u_{x,i}(s, t)$) and y-factor (y−$u_{y,i}(s, t)$) using the generated i-th (1≤i≤n) 2-variable polynomials $u_{x,i}(s, t)$ and $u_{y,i}(s, t)$, thus calculating the first to n-th x- and y-factors. The calculation unit distributes the generated i-th (1≤i≤n) x- and y-factors to the left-hand side and right-hand side, and the product of n x- and y-factors distributed to the left-hand side and that of n x- and y-factors distributed to the right-hand side are coupled via an equal sign to generate an equation. The calculation unit expands this generated equation to generate a polynomial of a 3D manifold A(x, y, s, t) as a public key.

In this manner, the digital signature system based on the public-key cryptosystem according to the embodiment can generate a robust digital signature which has high security and reliability, and generation can be implemented by a small computation amount.

What is claimed is:

1. A key generation apparatus for generating a finite field $F_q$, a three-dimensional manifold A(x, y, s, t) which is defined as having degrees of freedom of three dimensions of a set of solutions of simultaneous equations and is used as a public key for signature verification, is expressed by an x-coordinate, a y-coordinate, a parameter s, and a parameter t, and is defined on the finite field $F_q$, and a section which is used as a secret key for signature generation and is one of surfaces of the three-dimensional manifold A(x, y, s, t), x-coordinate and y-coordinate of the section being expressed by functions of the parameter s and the parameter t, comprising:
a memory;
a processor configured to:
generate n (n is a positive integer), first to n-th (n is a positive integer) 2-variable polynomials $u_{x,i}(s, t)$ (i: 1≤i≤n) for the parameter s and the parameter t defined on the finite field $F_q$, and n, first to n-th n 2-variable polynomials $u_{y,i}(s, t)$ (1≤i≤n) for the parameter s and the parameter t defined on the finite field $F_q$;
generate n, first to n-th sections Di (1≤i≤n) by generating an i-th section Di: (x, y, s, t)=($u_{x,i}(s, t)$, $u_{y,i}(s, t)$, s, t)(1≤i≤n) which has the i-th (1≤i≤n) 2-variable polynomials $u_{x,i}(s, t)$ and $u_{y,i}(s, t)$ as an x-coordinate and a y-coordinate, respectively;
generate first to n-th x-factors and y-factors by generating an i-th x-factor (x−$u_{x,i}(s, t)$) and y-factor (y−$u_{y,i}(s, t)$) using the i-th (1≤i≤n) 2-variable polynomials $u_{x,i}(s, t)$ and $u_{y,i}(s, t)$;
generate an equation obtained by distributing the i-th (1≤i≤n) x-factor and y-factor to a left-hand side and a right-hand side and coupling a product of n x-factors and y-factors distributed to the left-hand side and a product of n x-factors and y-factors distributed to the right-hand side by an equal sign; and
generate a polynomial of the three-dimensional manifold A(x, y, s, t) by expanding the equation.

2. The apparatus according to claim 1, wherein the processor is further configured to:
determine a maximum value $h_x$ of a degree associated with the parameter s of the 2-variable polynomial $u_{x,i}(s, t)$ and a maximum value kx of a degree associated with the parameter t;
generate the i-th 2-variable polynomial $u_{x,i}(s, t)$ (i: 1≤i≤n) which includes a plurality of monomials each of which has, as a factor, at least one of a variable s whose degree is equal to or less than the maximum value hx and a variable t whose degree is equal to or less than the maximum value kx, and a term of $s^{hx}t^{kx}$;
determine a maximum value hy of a degree associated with the parameter s of the 2-variable polynomial $u_{y,i}(s, t)$ and a maximum value ky of a degree associated with the parameter t; and
generate the i-th 2-variable polynomial $u_{y,i}(s, t)$ (i: 1≤i≤n) which includes a plurality of monomials each of which has, as a factor, at least one of a variable s whose degree is equal to or less than the maximum value hy and a variable t whose degree is equal to or less than the maximum value ky, and a term of $s^{hy}t^{ky}$.

3. A key generation method for generating a finite field $F_q$, a three-dimensional manifold A(x, y, s, t) which is defined as having degrees of freedom of three dimensions of a set of solutions of simultaneous equations and is used as a public key for signature verification, is expressed by an x-coordinate, a y-coordinate, a parameter s, and a parameter t, and is defined on the finite field $F_q$, and a section which is used as a secret key for signature generation and is one of surfaces of the three-dimensional manifold A(x, y, s, t), x-coordinate and y-coordinate of the section being expressed by functions of the parameter s and the parameter t, the method including:

generating n (n is a positive integer), first to n-th (n is a positive integer) 2-variable polynomials $u_{x,i}(s, t)$ (i: $1 \leq i \leq n$) for the parameter s and the parameter t defined on the finite field $F_q$, and n, first to n-th n 2-variable polynomials $u_{y,i}(s, t)$ (i: $1 \leq i \leq n$) for the parameter s and the parameter t defined on the finite field $F_q$;

generating n, first to n-th sections $D_i(1 \leq i \leq n)$ by generating an i-th section Di: (x, y, s, t)=($u_{x,i}(s, t)$, $u_{y,i}(s, t)$, s, t)($1 \leq i \leq n$) which has the i-th ($1 \leq i \leq n$) 2-variable polynomials $u_{x,i}(s, t)$ and $u_{y,i}(s, t)$ as an x-coordinate and a y-coordinate, respectively;

generating first to n-th x-factors and y-factors by generating an i-th x-factor (x−$u_{x,i}(s, t)$) and y-factor (y−$u_{y,i}(s, t)$) using the i-th ($1 \leq i \leq n$) 2-variable polynomials $u_{x,i}(s, t)$ and $u_{y,i}(s, t)$;

generating an equation obtained by distributing the i-th ($1 \leq i \leq n$) x-factor and y-factor to a left-hand side and a right-hand side and coupling a product of n x-factors and y-factors distributed to the left-hand side and a product of n x-factors and y-factors distributed to the right-hand side by an equal sign; and generating a polynomial of the three-dimensional manifold A(x, y, s, t) by expanding the equation.

4. The method according to claim 3, wherein generating first to n-th 2-variable polynomials $u_{x,i}(s, t)$ includes:

determining a maximum value hx of a degree associated with the parameter s of the 2-variable polynomial $u_{x,i}(s, t)$ and a maximum value kx of a degree associated with the parameter t;

generating the i-th 2-variable polynomial $u_{x,i}(s, t)$ (i: $1 \leq i \leq n$) which includes a plurality of monomials each of which has, as a factor, at least one of a variable s whose degree is equal to or less than the maximum value hx and a variable t whose degree is equal to or less than the maximum value kx, and a term of $s^{hx}t^{kx}$;

determining a maximum value by of a degree associated with the parameter s of the 2-variable polynomial $u_{y,i}(s, t)$ and a maximum value ky of a degree associated with the parameter t; and generating the i-th 2-variable polynomial $u_{y,i}(s, t)$ (i: $1 \leq i \leq n$) which includes a plurality of monomials each of which has, as a factor, at least one of a variable s whose degree is equal to or less than the maximum value by and a variable t whose degree is equal to or less than the maximum value ky, and a term of $s^{hy}t^{ky}$.

5. A key generation program for generating a finite field $F_q$, a three-dimensional manifold A(x, y, s, t) which is defined as having degrees of freedom of three dimensions of a set of solutions of simultaneous equations and is used as a public key for signature verification, is expressed by an x-coordinate, a y-coordinate, a parameter s, and a parameter t, and is defined on the finite field $F_q$, and a section which is used as a secret key for signature generation and is one of surfaces of the three-dimensional manifold A(x, y, s, t), x-coordinate and y-coordinate of the section being expressed by functions of the parameter s and the parameter t, the program stored on a non-transitory computer readable medium, the program including:

a first program instruction which, when executed, instructs a computer processor to generate n (n is a positive integer), first to n-th (n is a positive integer), 2-variable polynomials $u_{x,i}(s, t)$ (i: $1 \leq i \leq n$) for the parameter s and the parameter t defined on the finite field $F_q$, and n, first to n-th n 2-variable polynomials $u_{y,i}(s, t)$ (i: $1 \leq i \leq n$) for the parameter s and the parameter t defined on the finite field $F_q$;

a second program instruction which, when executed, instructs the computer processor to generate n, first to n-th sections Di ($1 \leq i \leq n$) by generating an i-th section Di: (x, y, s, t)=($u_{x,i}(s, t)$, $u_{y,i}(s, t)$, s, t) ($1 \leq i \leq n$) which has the i-th ($1 \leq i \leq n$) 2-variable polynomials $u_{x,i}(s, t)$ and $u_{y,i}(s, t)$ as an x-coordinate and a y-coordinate, respectively;

a third program instruction which, when executed, instructs the computer processor to generate first to n-th x-factors and y-factors by generating an i-th x-factor (x−$u_{x,i}(s, t)$) and y-factor (y−$u_{y,i}(s, t)$) using the i-th ($1 \leq i \leq n$) 2-variable polynomials $u_{x,i}(s, t)$ and $u_{y,i}(s, t)$;

a fourth program instruction which, when executed, instructs the computer processor to generate an equation obtained by distributing the i-th ($1 \leq i \leq n$) x-factor and y-factor to a left-hand side and a right-hand side and coupling a product of n x-factors and y-factors distributed to the left-hand side and a product of n x-factors and y-factors distributed to the right-hand side by an equal sign; and a fifth program instruction which, when executed, instructs the computer processor to generate a polynomial of the three-dimensional manifold A(x, y, s, t) by expanding the equation.

6. The program according to claim 5, wherein the first program instruction further instructs the computer processor (1) to determine a maximum value hx of a degree associated with the parameter s of the 2-variable polynomial $u_{x,i}(s, t)$ and a maximum value kx of a degree associated with the parameter t; (2) to generate the i-th 2-variable polynomial $u_{x,i}(s, t)$ (i: $1 \leq i \leq n$) which includes a plurality of monomials each of which has, as a factor, at least one of a variable s whose degree is equal to or less than the maximum value hx and a variable t whose degree is equal to or less than the maximum value kx, and a term of $s^{hx}t^{kx}$; (3) to determine a maximum value by of a degree associated with the parameter s of the 2-variable polynomial $u_{y,i}(s, t)$ and a maximum value ky of a degree associated with the parameter t; and (4) to generate the i-th 2-variable polynomial $u_{y,i}(s, t)$ (i: $1 \leq i \leq n$) which includes a plurality of monomials each of which has, as a factor, at least one of a variable s whose degree is equal to or less than the maximum value by and a variable t whose degree is equal to or less than the maximum value ky, and a term of $s^{hy}t^{ky}$.

* * * * *

UNITED STATES PATENT AND TRADEMARK OFFICE
CERTIFICATE OF CORRECTION

PATENT NO.        : 8,832,438 B2
APPLICATION NO.   : 13/887764
DATED             : September 9, 2014
INVENTOR(S)       : Akiyama et al.

It is certified that error appears in the above-identified patent and that said Letters Patent is hereby corrected as shown below:

In the Claims,

Claim 4, column 23, line 39, change "determining a maximum value by of a degree" to --determining a maximum value hy of a degree--.

Claim 4, column 23, line 46, change "the maximum value by and a variable t" to --the maximum value hy and a variable t--.

Claim 6, column 24, lines 47-48, change "to determine a maximum value by of a degree" to --to determine a maximum value hy of a degree--.

Claim 6, column 24, lines 53-54, change "the maximum value by and a variable t" to --the maximum value hy and a variable t--.

Signed and Sealed this
Sixth Day of January, 2015

Michelle K. Lee
*Deputy Director of the United States Patent and Trademark Office*